(12) United States Patent
Holland et al.

(10) Patent No.: US 9,315,669 B2
(45) Date of Patent: Apr. 19, 2016

(54) METHOD FOR MAKING UV-ABSORBING OPHTHALMIC LENSES

(71) Applicant: Novartis AG, Basel (CH)

(72) Inventors: Troy Vernon Holland, Suwanee, GA (US); Frank Chang, Cumming, GA (US); Uwe Haken, Norcross, GA (US); Joseph I. Weinschenk, III, Fort Worth, TX (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 14/494,186

(22) Filed: Sep. 23, 2014

(65) Prior Publication Data

US 2015/0094393 A1 Apr. 2, 2015

Related U.S. Application Data

(60) Provisional application No. 61/884,181, filed on Sep. 30, 2013.

(51) Int. Cl.

| | | |
|---|---|---|
| *C08F 2/46* | (2006.01) | |
| *C08F 2/50* | (2006.01) | |
| *C08G 61/04* | (2006.01) | |
| *C08L 83/04* | (2006.01) | |
| *G02B 1/04* | (2006.01) | |
| *C08F 220/54* | (2006.01) | |
| *C08F 230/08* | (2006.01) | |

(52) U.S. Cl.
CPC .............. *C08L 83/04* (2013.01); *C08F 220/54* (2013.01); *C08F 230/08* (2013.01); *G02B 1/043* (2013.01)

(58) Field of Classification Search
CPC ...... C08L 83/04; C08F 220/54; C08F 230/08; G02B 1/043
USPC ................... 522/66, 6, 71, 189, 184, 1; 520/1
See application file for complete search history.

(56) References Cited

U.S. PATENT DOCUMENTS

| | | | |
|---|---|---|---|
| 3,162,676 A | 12/1964 | Goldberg | |
| 3,299,173 A | 1/1967 | Roselli | |
| 4,312,575 A | 1/1982 | Peyman | |
| 4,444,711 A | 4/1984 | Schad | |
| 4,460,534 A | 7/1984 | Boehm | |
| 4,528,311 A | 7/1985 | Beard | |
| 4,612,358 A | 9/1986 | Besecke | |
| 4,632,844 A | 12/1986 | Yanagihara | |
| 4,716,234 A | 12/1987 | Dunks | |
| 4,835,312 A | 5/1989 | Itoh | |
| 5,508,317 A | 4/1996 | Mueller | |
| 5,760,100 A | 6/1998 | Nicolson | |
| 5,789,464 A | 8/1998 | Mueller | |
| 5,843,346 A | 12/1998 | Morrill | |
| 5,849,810 A | 12/1998 | Mueller | |
| 5,849,811 A | 12/1998 | Nicolson | |
| 5,894,002 A | 4/1999 | Boneberger | |
| 6,039,913 A | 3/2000 | Hirt | |
| 6,367,929 B1 | 4/2002 | Maiden | |
| 6,451,871 B1 | 9/2002 | Winterton | |
| 6,627,124 B1 | 9/2003 | Herbrechtsmeir | |
| 6,719,929 B2 | 4/2004 | Winterton | |
| 6,793,973 B2 | 9/2004 | Winterton | |
| 6,800,225 B1 | 10/2004 | Hagmann | |
| 6,811,805 B2 | 11/2004 | Gilliard | |
| 6,822,016 B2 | 11/2004 | McCabe | |
| 6,896,926 B2 | 5/2005 | Qiu | |
| 7,091,283 B2 | 8/2006 | Mueller | |
| 7,238,750 B2 | 7/2007 | Mueller | |
| 7,268,189 B2 | 9/2007 | Mueller | |
| 7,384,590 B2 | 6/2008 | Kelly | |
| 7,387,759 B2 | 6/2008 | Kelly | |
| 7,521,519 B1 | 4/2009 | Hirt | |
| 7,605,190 B2 | 10/2009 | Moszner | |
| 7,858,000 B2 | 12/2010 | Winterton | |
| 8,147,897 B2 | 4/2012 | Ferreiro | |
| 8,153,703 B2 | 4/2012 | Laredo | |
| 8,163,206 B2 * | 4/2012 | Chang et al. ................. | 264/1.38 |
| 8,232,326 B2 | 7/2012 | Laredo | |
| 8,409,599 B2 | 4/2013 | Wu | |
| 8,431,624 B2 | 4/2013 | Domschke | |
| 8,480,227 B2 | 7/2013 | Qiu | |

(Continued)

FOREIGN PATENT DOCUMENTS

| | | |
|---|---|---|
| EP | 1905415 B1 | 7/2009 |
| EP | 213622 B1 | 8/2012 |

(Continued)

OTHER PUBLICATIONS

PCT International Search Report dated Dec. 17, 2015, International Application No. PCT/US2014/057019, International Filing Date Sep. 23, 2014.
PCT Written Opinion of the International Searching Authority dated Dec. 17, 2015, International Application No. PCT/US2014/057019, International Filing Date Sep. 23, 2014.
Winterton et al., The Cornea: Transactions of the World Congress on the Cornea 111, H.D. Cavanagh Ed., Raven Press: New York 1988, pp. 273-280.
Durmaz, Y.Y. et. al, Visible Light Initiated Free Radical Promoted Cationic Polymerization Using Acylgermane Based Photoinitiator in the Presence of Onium Salts, Macromolecules 2008, 41, 6714-6718.

(Continued)

*Primary Examiner* — Ling Choi
*Assistant Examiner* — Jessica E Whiteley
(74) *Attorney, Agent, or Firm* — Jian Zhou

(57) ABSTRACT

Described herein is a method for producing UV-absorbing silicone hydrogel contact lenses, which is free or substantially free of internal stress and also is capable of blocking ultraviolet ("UV") radiation and optionally (but preferably) violet radiation with wavelengths from 381 nm to 440 nm, according to a photocuring technology, preferably according to the Lightstream Technology™. This invention also provides UV-absorbing contact lenses made according to a method of the invention.

17 Claims, 9 Drawing Sheets

(56) References Cited

U.S. PATENT DOCUMENTS

| | | |
|---|---|---|
| 8,557,940 B2 | 10/2013 | Chang |
| 2008/0015315 A1 | 1/2008 | Chang |
| 2008/0143003 A1 | 6/2008 | Phelan |
| 2008/0143958 A1 | 6/2008 | Medina |
| 2008/0231798 A1 | 9/2008 | Zhou |
| 2008/0234457 A1 | 9/2008 | Zhou |
| 2008/0277814 A1 | 11/2008 | Moszner |
| 2010/0249356 A1 | 9/2010 | Rathore |
| 2011/0063567 A1 | 3/2011 | Domschke |
| 2011/0134387 A1 | 6/2011 | Samuel |
| 2012/0026457 A1 | 2/2012 | Qiu |
| 2012/0029111 A1 | 2/2012 | Chang |
| 2012/0088843 A1 | 4/2012 | Chang |
| 2012/0088844 A1 | 4/2012 | Kuyu |
| 2012/0088861 A1 | 4/2012 | Huang |
| 2013/0118127 A1 | 5/2013 | Kolluru |
| 2014/0171539 A1 | 6/2014 | Chang |
| 2014/0171542 A1 | 6/2014 | Chang |
| 2015/0080490 A1* | 3/2015 | Burtscher et al. ............... 522/18 |
| 2015/0092155 A1 | 4/2015 | Chang |

FOREIGN PATENT DOCUMENTS

| | | |
|---|---|---|
| WO | 2010071691 A1 | 6/2010 |
| WO | 2014093772 A1 | 6/2014 |

OTHER PUBLICATIONS

Ganster, B. et. al, New Photocleavable Structures. Diacylgermane-Based Photoinitiators for Visible Light Curing, Macromolecules 2008, 41, 2394-2400.

Moszner, N. et al, Benzoyl germanium Derivatives as Novel Visible Light Photoinitiators for Dental Materials, Dental Materials 2008, 24, 901-907.

Moszner, N. et al, Benzoylgermanium Derivatives as Novel Visible-Light Photoinitiators for Dental Composites, Macromolecular Materials Engineering 2009, 294, 877-886.

Tehfe, M. et. al, Bis(germyl)ketones: Toward a New Class of Type I Photoinitiating Systems Sensitive Above 500 nm?a, Macromolecular Rapid Communications 2010, 31, 473-478.

PCT International Search Report dated Dec. 17, 2014, International Application No. PCT/US2014/057442, International Filing Date Sep. 25, 2014.

PCT Written Opinion of the International Searching Authority dated Dec. 17, 2014, International Application No. PCT/US2014/057442, International Filing Date Sep. 25, 2014.

* cited by examiner

METHOD FOR MAKING UV-ABSORBING OPHTHALMIC LENSES

This application claims the benefit under 35 USC §119 (e) of U.S. provisional application No. 61/884,181 filed 30 Sep. 2013, incorporated by reference in its entirety.

This invention is related to a method for producing UV-absorbing silicone hydrogel contact lenses capable of blocking ultra-violet ("UV") radiation (from 280 nm to 380 nm) and optionally (but preferably) violet radiation with wavelengths from 381 nm to 440 nm, thereby protecting eyes to some extent from damages caused by UV radiation and potentially by high energy violet light (HEVL). This invention also provides UV-absorbing ophthalmic lenses made according to a method of the invention.

BACKGROUND

Unlike other commercial silicone hydrogel contact lenses, DAILIES TOTAL1® water gradient silicone hydrogel contact lenses are produced by using an unconventional cast-molding technology—the so-called Lightstream Technology™ (ALCON), as illustrated in U.S. Pat. Nos. 5,508,317, 5,789,464, 5,849,810, 6,800,225, and 8,163,206, which are incorporated by reference in their entireties. The Lightstream Technology™ involves (1) a lens-forming composition, (2) reusable molds produced in high precision, and (3) curing under a spatial limitation of actinic radiation (e.g., UV/Visible light) for a very short period of time (e.g., less than about 30 seconds). Lenses produced according to the Lightstream Technology™ can have high consistency and high fidelity to the original lens design, because of use of reusable, high precision molds. In addition, contact lenses with high quality can be produced at relatively lower cost due to the short curing time and a high production yield. However, the Lightstream Technology™ has not been applied to make UV-absorbing silicone hydrogel contact lenses.

Furthermore, due to the presence of UV-absorber and possibly some visibility-tinting agents, the photocuring of a lens-forming composition in a mold may not be effected uniformly and resultant lenses may have unacceptable internal stress derived from the non-uniform curing.

Therefore, there is still a need for a method for making UV-absorbing silicone hydrogel contact lenses having no or minimal internal stress, according to a photocuring technology, especially according to the Lightstream Technology™.

SUMMARY

The present invention is generally related to a method for making silicone hydrogel contact lenses which have an UVB transmittance of about 10% or less (preferably about 5% or less, more preferably about 2.5% or less, even more preferably about 1% or less) between 280 and 315 nanometers, an UVA transmittance of about 30% or less (preferably about 20% or less, more preferably about 10% or less, even more preferably about 5% or less) between 316 and 380 nanometers, and optionally (but preferably) an average violet transmittance of about 70% or less (preferably about 65% or less, more preferably about 60% or less, even more preferably about 55% or less) between 381 nm and 440 nm. A method of the invention comprises the steps of: (1) providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; (2) introducing a pre-polymerization mixture of lens-forming materials into the cavity, wherein the pre-polymerization mixture comprises at least one hydrophilic vinylic monomer, at least one siloxane-containing vinylic monomer, at least one polysiloxane crosslinker (with two or more ethylenically-unsaturated groups), at least one UV-absorbing vinylic monomer that absorbs ultraviolet light and optionally (but preferably) high-energy violet light from 381 nm to 440 nm, at least one tinting agent, and from about 0.05% to about 1.5% by weight of at least one germanium-based Norrish Type I photoinitiator capable of initiating a free-radical polymerization under irradiation with a light source including a light in the region of about 380 to about 550 nm; and (3) irradiating the mixture in the mold with a light in a region of from 380 to 550 nm and crosslinking the lens-forming materials to form the UV-absorbing silicone hydrogel contact lens.

BRIEF DESCRIPTIONS OF THE DRAWINGS

DETAILED DESCRIPTION

Figure 1:
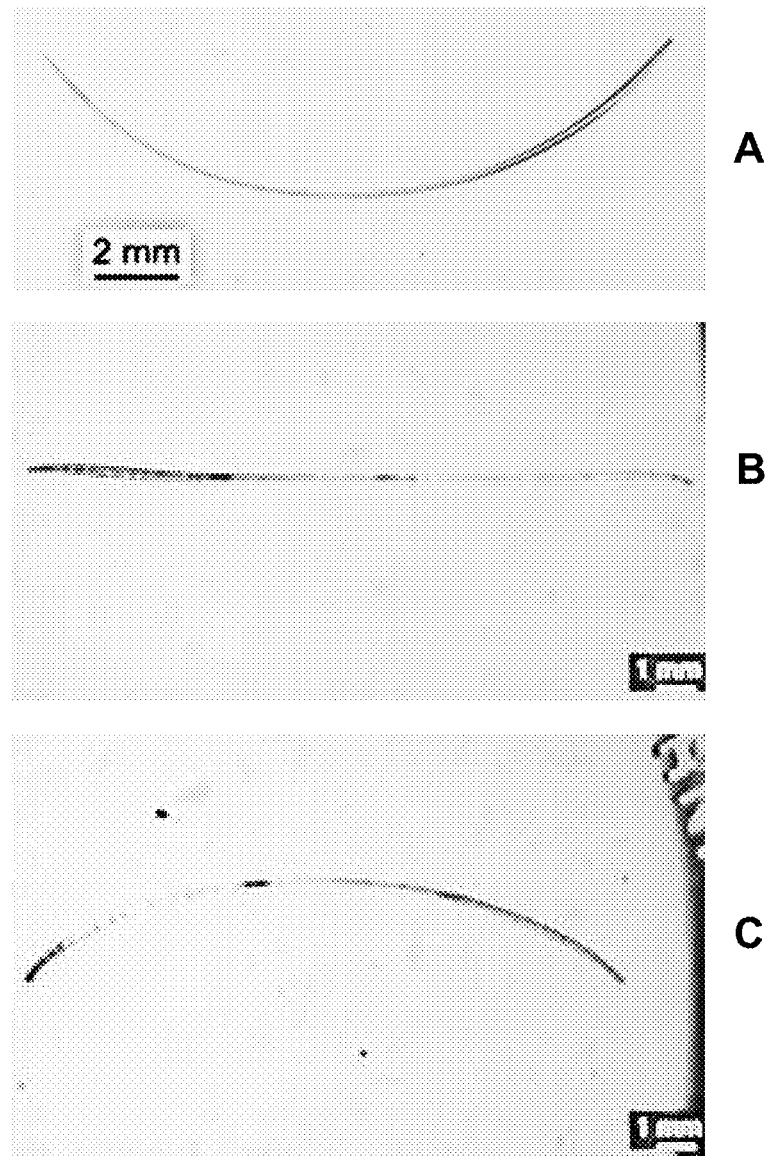
FIG. 1 illustrates the internal stress levels of three cast-molded silicone hydrogel contact lenses: A—substantially free of internal stress; B—strong internal stress; and C—extremely strong internal stress.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic lens" refers to a contact lens and/or an intraocular lens. A "contact Lens" refers to a structure that can be placed on or within a wearer's eye. A contact lens can correct, improve, or alter a user's eyesight, but that need not be the case. A "silicone hydrogel contact lens" refers to a contact lens comprising a silicone hydrogel material.

As used in this application, the term "hydrogel" or "hydrogel material" refers to a crosslinked polymeric material which is not water-soluble and can contains at least 10% by weight of water within its polymer matrix when fully hydrated.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer" refers to a compound that has one sole ethylenically-unsaturated group.

The term "soluble", in reference to a compound or material in a solvent, means that the compound or material can be dissolved in the solvent to give a solution with a concentration of at least about 0.5% by weight at room temperature (i.e., a temperature of about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

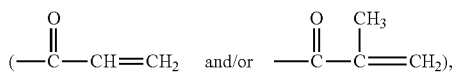

allyl, vinyl

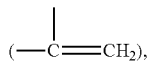

styrenyl, or other C=C containing groups.

The term "(meth)acrylamide" refers to methacrylamide and/or acrylamide.

The term "(meth)acrylamido" refers to an ethylenically-unsaturated group of

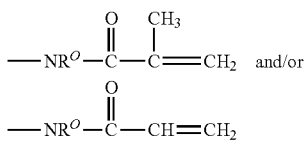

in which R° is hydrogen or $C_1$-$C_{10}$-alkyl.

The term "ene group" refers to a monovalent radical comprising $CH_2$=CH— that is not covalently attached to an oxygen or nitrogen atom or a carbonyl group.

As used in this application, the term "(meth)acrylamide-type monomer" refers to a vinylic monomer containing one (meth)acrylamido group.

The term "(meth)acrylate" refers to methacrylate and/or acrylate.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

"UVA" refers to radiation occurring at wavelengths between 316 and 380 nanometers; "UVB" refers to radiation occurring between 280 and 315 nanometers; "Violet" refers to radiation occurring at wavelengths between 381 and 440 nanometers.

"UVA transmittance" (or "UVA % T"), "UVB transmittance" or "UVB % T", and "average violet-transmittance" or "Violet % T" are calculated by the following formula $$UVA\ \%\ T = \frac{\text{Average \% Transmission between 316 nm and 380 nm}}{\text{Luminescence \% } T}$$

$$UVB\ \%\ T = \frac{\text{Average \% Transmission between 280 nm and 315 nm}}{\text{Luminescence \% } T}$$

$$\text{Violet \% } T = \text{Average \% Transmission between 381 nm and 440 nm}$$

in which Luminescence % T is defined according to ISO 18369-3 (section 4.6.1.2)

As used in this application, the term "macromer" or "prepolymer" refers to a medium and high molecular weight compound or polymer that contains two or more ethylenically unsaturated groups. Medium and high molecular weight typically means average molecular weights greater than 700 Daltons.

As used in this application, the term "crosslinker" refers to a compound having at least two ethylenically unsaturated groups. A "crosslinking agent" refers to a crosslinker having a molecular weight of about 700 Daltons or less.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the weight-average molecular weight unless otherwise specifically noted or unless testing conditions indicate otherwise.

As used in this application, the term "amino group" refers to a primary or secondary amino group of formula —NHR°, where R° is hydrogen or $C_1$-$C_{10}$-alkyl, unless otherwise specifically noted.

A "linear oligodimethylsiloxane chain" refers to a divalent radical of

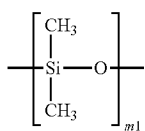

in which m1 is an integer of from 3 to 10, preferably from 3 to 8, more preferably from 3 to 5.

A "polysiloxane" refers to a segment of

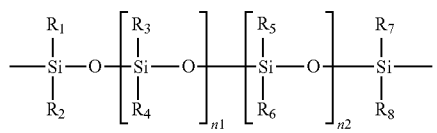

in which n1 and n2 independently of each other are an integer of from 0 to 500 and (n1+n2) is from 10 to 500, $R_1$, $R_2$, $R_3$, $R_4$, $R_5$, $R_6$, $R_7$, and $R_8$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, or -alk-$(OC_2H_4)_{n3}$—OR° (in which alk is $C_1$-$C_6$-alkylene divalent radical, R° is H or $C_1$-$C_{10}$ alkyl and n3 is an integer from 1 to 10).

The term "fluid" as used herein indicates that a material is capable of flowing like a liquid.

The term "alkyl" refers to a monovalent radical obtained by removing a hydrogen atom from a linear or branched alkane compound. An alkyl group (radical) forms one bond with one other group in an organic compound.

The term "alkylene" refers to a divalent radical obtained by removing one hydrogen atom from an alkyl. An alkylene group (or radical) forms two bonds with other groups in an organic compound.

In this application, the term "substituted" in reference to an alkylene divalent radical or an alkyl radical means that the alkylene divalent radical or the alkyl radical comprises at least one substituent which replaces one hydrogen atom of the alkylene or alkyl radical and is selected from the group consisting of hydroxyl, carboxyl, —$NH_2$, sulfhydryl, $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, an "oxazoline" refers to a compound of

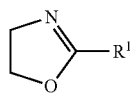

in which $R^1$ is hydrogen, methyl or ethyl group.

A "polyoxazoline segment" refers to a divalent radical of

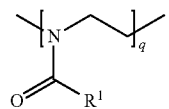

in which $R^1$ is hydrogen, methyl or ethyl group, and q is an integer from 3 to 500 and is obtained in a ring-opening polymerization.

The term "azetidinium" refers to a positively-charged, divalent radical (or group or moiety) of

in which $T_1$ and $T_2$ are a direct bond connecting to one monovalent radical.

The term "azlactone" refers to a mono-valent radical of

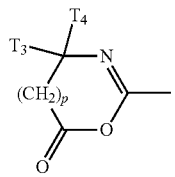

in which p is 0 or 1; $T_3$ and $T_4$ independently of each other is $C_1$-$C_8$ alkyl (preferably methyl).

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "UV-absorbing vinylic monomer" refers to a compound comprising an ethylenically-unsaturated group and a UV-absorbing moiety which can absorb or screen out UV radiation in the range from 200 nm to 400 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

A "tinting agent" refers to a color additive (e.g., copper phthalocyanine) which is capable of creating a light color (e.g., blue or green) edge-to-edge visibility tint for facilitating the handling of contact lenses. Visibility tinted contact lenses are virtually invisible once they are worn by a wearer and cannot change eye color of a wear in any way.

The term "effective intensity on initiator" or "EII" refers to the overlap of the spectral intensity distribution of a curing light with the absorbance spectrum of an initiator. Such an overlap is calculated by integration, over a given wavelength range (e.g., from 380 nm to 480 nm), of the product of the spectral intensity distribution of the curing light and the (1−T) curve of the initiator, in which T is defined as the transmittance, according to the following equation.

$$EII = \int_{lower}^{upper} (I_0(1-T))\,d\lambda$$

The term "intensity gradient" refers to the ratio of the EII value of an initiator and the total intensity of a curing light over a given wavelength range (e.g., from 380 nm to 480 nm), according to the following equation.

$$\%\ int\ grad = \frac{\int_{lower}^{upper} (I_0(1-T))\,d\lambda}{\int_{lower}^{upper} (I_0)\,d\lambda}$$

The term "good cross-section" means that a cross-section of a cast-molded contact lens does not show internal stress when being analyzed by metrology for cross-sections, as shown by that the curvature of the cross-section is close to the curvature of the forming molds (FIG. 1A). A flat cross section (FIG. 1B), a relatively-flat and slightly-twisted curvature (Example 10) or an opposite curvature (FIG. 1C) would indicate that internal stress inside the lens is too strong. Internal stress within a cast-molded lens indicates inhomogeneous network throughout a cast-molded lens and is generally caused by non-uniform curing of a lens-forming composition in a mold. Cross-sections are inspected for internal stress according to the procedures described in Example 1.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means an oxygen permeability (Dk) which is measured at and corrected for the surface resistance to oxygen flux caused by the boundary layer effect according to the procedures shown in Examples hereinafter. Oxygen permeability is conventionally expressed in units of barrers, where "barrer" is defined as $[(cm^3\ oxygen)(mm)/(cm^2)(sec)(mm\ Hg)] \times 10^{-9}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3\ oxygen)/(cm^2)(sec)(mm\ Hg)] \times 10^{-9}$.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Pat. No. 7,858,000 (herein incorporated by reference in its entirety), and a hydrophilic coating composed of covalent attachment and/or physical deposition of one or more layers of one or more hydrophilic polymer onto the surface of a contact lens disclosed in U.S. Pat. Nos. 8,147,897 and 8,409,599 and US Patent Application Publication Nos. 2011/0134387, 2012/0026457 and 2013/0118127 (herein incorporated by references in their entireties).

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (static water contact angle measured by Sessile Drop), which is obtained by averaging measurements of at least 3 individual contact lenses.

The invention is directed to a method for making silicone hydrogel contact lenses which are free of or substantially free of internal stress and have an UVB transmittance of about 10% or less (preferably about 5% or less, more preferably about 2.5% or less, even more preferably about 1% or less) between 280 and 315 nanometers, an UVA transmittance of about 30% or less (preferably about 20% or less, more preferably about 10% or less, even more preferably about 5% or less) between 316 and 380 nanometers, and optionally (but preferably) an average violet transmittance of about 70% or less (preferably about 65% or less, more preferably about 60% or less, even more preferably about 55% or less) between 381 nm and 440 nm. The present invention is partly based on the discovery that a germanium-based Norrish Type I photoinitiator can be advantageously used in making silicone hydrogel contact lenses that absorb UV radiation and optionally (but preferably) HEVL radiation and is free of or substantially free of internal stress typically associated with contact lenses obtained by photocuring of a lens-forming composition having an UV-absorbing vinylic monomer (and additionally some tinting agents) in molds. Limited number of photo-initiators are available that are active in the visible region and provide fast cure times. Phosphine oxide type photoinitiators (i.e., TPO) and Germanium type photoinitiators (Ge-PI) may meet these basic requirements. However, it is found here that, unlike TPO, Ge-PI can be used to cure a lens-forming composition to form silicone hydrogel contact lenses which are substantially-free or completely-free of internal stress observed by metrology inspection of a cross-section of a lens. Silicone hydrogel contact lenses obtained from a lens-forming composition including TPO as photoinitiator have internal stress, as observed by metrology inspection of a cross-section of the lens, although the lens-forming composition with TPO have comparable values of effective intensity on initiator (EII) and intensity gradient over a 100-µm path length similar to those of a lens-forming composition with Ge-PI. It is believed that Ge-PI is susceptible to photobleaching and its higher intensity gradient and higher EII values may not adversely affect curing of a lens-forming composition in a mold for making silicone hydrogel contact lenses capable of absorbing UV radiation and can minimize or eliminate the source for causing the internal stress within such silicone hydrogel contact lenses.

The present invention is also partly based on the discovery that by selecting the combination of UV-absorbing vinylic monomers, germanium-based Norrish Type I photoinitiator, and (meth)acrylamide-type monomers and/or macromers in preparing a mixture for making UV-absorbing silicone hydrogel contact lenses as well as a visible radiation as curing radiation source, the curing time of the mixture in a mold can be shortened so as to make the mixture suitable for making UV-absorbing silicone hydrogel contact lenses based on the Lightstream Technology™. The relatively-short curing time involved in the invention can ensure that contact lenses with high quality lens edge are produced at a lower cost. It is believed that a relatively longer curing time may adversely affect the quality of lens edge of contact lenses made according to the Lightstream Technology™ and can increase the product cost by lowering the production output. Although one might be able to shorten the curing time of a mixture by increasing the curing light intensity and/or the concentration of a photoinitiator in the mixture, the high curing light intensity and high photoinitiator concentration have limits and may not be sufficient to reduce the curing time enough for the Lightstream Technology™. Further, these measures may cause resultant lenses with undesirable physical properties, such as, for example, fragile and high content of extractable due to unpolymerized monomers. In addition, ineffective or uneven photo-polymerization of the lens forming composition due to the presence of a UV-absorber may be minimized or eliminated by using Ge-PI. With a mixture of the invention, a curing time of less than about 30 seconds, for example, can be achieved with a 445 nm LED light source (e.g., a curing light intensity of about 60 mW/cm² or less). UV-absorbing silicone hydrogel contact lenses made from such a mixture according to the Lightstream Technology can have high lens edge quality, relatively low lens production cost because of the relatively short curing time, and minimal or no internal stress.

In one aspect, the present invention provides a method for making silicone hydrogel contact lenses which have an UVB transmittance of about 10% or less (preferably about 5% or less, more preferably about 2.5% or less, even more preferably about 1% or less) between 280 and 315 nanometers, an UVA transmittance of about 30% or less (preferably about 20% or less, more preferably about 10% or less, even more preferably about 5% or less) between 316 and 380 nanometers, and optionally (but preferably) an average violet transmittance of about 70% or less (preferably about 65% or less, more preferably about 60% or less, even more preferably about 55% or less) between 381 nm and 440 nm, the method comprising the steps of: (1) providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; (2) introducing a pre-polymerization mixture of lens-forming materials into the cavity, wherein the pre-polymerization mixture comprises at least one hydrophilic vinylic monomer, at least one siloxane-containing vinylic monomer, at least one polysiloxane crosslinker (with two or more ethylenically-unsaturated groups), at least one UV-absorbing vinylic monomer that absorbs ultraviolet light and optionally (but preferably) high-energy violet light from 381 nm to 440 nm, at least one tinting agent, and from about 0.05% to about 1.5% by weight of at least one germanium-based Norrish Type I photoinitiator capable of initiating a free-radical polymerization under irradiation with a light source including a light in the region of about 380 to about 550 nm; and (3) irradiating the prepolymerization mixture in the mold with a light in a region of from 380 to 550 nm and crosslinking the lens-forming materials to form an UV-absorbing silicone hydrogel contact lens.

In a preferred embodiment, in the pre-polymerization mixture the hydrophilic vinylic monomer is a hydrophilic (meth)acrylamide-type monomer and the siloxane-containing vinylic monomer is a siloxane-containing (meth)acrylamide-type monomer; the pre-polymerization mixture is characterized by having an ability to be cured within about 100 seconds by a visible light having an intensity sufficient to produce lenses of good quality (preferably a total intensity of from about 10 to about 100 mW/cm² in the wavelength region from 380 nm to 550 nm); and the step of irradiating is performed under a spatial limitation of actinic radiation) for a time period of about 120 seconds or less by using the light source including the light in the region of from 380 to 550 nm.

In another preferred embodiment, the pre-polymerization mixture comprises a first UV-absorbing vinylic monomer that absorbs UV radiation and HEVL radiation of from 380 nm to 440 nm, and a violet-tinting agent (preferably Carbazole Violet). More preferably, the pre-polymerization mixture further comprises a second UV-absorbing vinylic monomer that absorbs UV radiation. It is understood that the terms "first" and "second" are used in this application to mean that they are different from each other.

Lens molds for making contact lenses are well known to a person skilled in the art. Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et at; U.S. Pat. No. 5,843,346 to Morrill; and U.S. Pat. No. 5,894,002 to Boneberger et al., which are also incorporated herein by reference. Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

Preferably, a reusable mold suitable for spatial limitation of radiation is used in the invention, the projected beam of radiation (e.g., radiation from the light source including the light in the region of 380 nm to 550 nm) limits radiation (e.g., UV radiation) impinging on the pre-polymerization mixture of the lens-forming materials located in the path of the projected beam from the first molding surface to the second molding surface of the reusable mold. The resultant contact lens comprises an anterior surface defined by the first molding surface, an opposite posterior surface defined by the second molding surface, and a lens edge (with sharp edge and high quality) defined by the sectional profile of the projected radiation beam (i.e., a spatial limitation of radiation). Examples of reusable molds suitable for spatial limitation of radiation include without limitation those disclosed in U.S. Pat. Nos. 6,627,124, 6,800,225, 7,384,590, and 7,387,759, which are incorporated by reference in their entireties.

For example, a preferred reusable mold comprises a first mold half having a first molding surface and a second mold half having a second molding surface. The two mold halves of the preferred reusable mold are not touching each other, but there is a thin gap of annular design arranged between the two mold halves. The gap is connected to the mold cavity formed between the first and second molding surfaces, so that excess pre-polymerization mixture can flow into the gap. It is understood that gaps with any design can be used in the invention.

In a preferred embodiment, at least one of the first and second molding surfaces is permeable to a crosslinking radiation. More preferably, one of the first and second molding surfaces is permeable to a crosslinking radiation while the other molding surface is poorly permeable to the crosslinking radiation.

The reusable mold preferably comprises a mask which is fixed, constructed or arranged in, at or on the mold half having the radiation-permeable molding surface. The mask is impermeable or at least of poor permeability compared with the permeability of the radiation-permeable molding surface. The mask extends inwardly right up to the mold cavity and surrounds the mold cavity so as to screen all areas behind the mask with the exception of the mold cavity.

The mask may preferably be a thin chromium layer, which can be produced according to processes as known, for example, in photo and UV lithography. Other metals or metal oxides may also be suitable mask materials. The mask can also be coated with a protective layer, for example of silicon dioxide if the material used for the mold or mold half is quartz.

Alternatively, the mask can be a masking collar made of a material comprising a UV-absorber and substantially blocks curing energy therethrough as described in U.S. Pat. No. 7,387,759 (incorporated by reference in its entirety). In this preferred embodiment, the mold half with the mask comprises a generally circular disc-shaped transmissive portion and a masking collar having an inner diameter adapted to fit in close engagement with the transmissive portion, wherein said transmissive portion is made from an optically clear material and allows passage of curing energy therethrough, and wherein the masking collar is made from a material comprising a light-blocker and substantially blocks passage of curing energy therethrough, wherein the masking collar generally resembles a washer or a doughnut, with a center hole for receiving the transmissive portion, wherein the transmissive portion is pressed into the center opening of the masking collar and the masking collar is mounted within a bushing sleeve.

Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual molding surfaces, damage as a result of contact is ruled out. This ensures a high service life of the molds, which, in particular, also ensures high reproducibility of the contact lenses to be produced and high fidelity to the lens design.

Examples of preferred hydrophilic vinylic monomers are (meth)acrylamide-type monomers, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, di methylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol (meth)acrylate having a weight average molecular weight of up to 1500, (meth)acrylic acid, N-vinyl formamide, N-vinyl acetamide, N-vinyl isopropylamide, N-vinyl-N-methyl acetamide, allyl alcohol, N-vinyl caprolactam, and mixtures thereof.

Examples of preferred hydrophilic (meth)acrylamide-type monomers includes without limitation N,N-dimethylacrylamide, N,N-dimethylmethacrylamide, N-(hydroxymethyl) acrylamide, N-hydroxyethyl acrylamide, N-hydroxypropyl acrylamide, N-[Tris(hydroxymethyl)methyl]acrylamide, acrylamide, methacrylamide, N-(2-aminoethyl)(meth)acrylamide, N-(3-aminopropyl)(meth)acrylamide, or a mixture thereof. Preferably, N,N-dimethylacrylamide is used in the invention. It is understood that other hydrophilic (meth)acrylamide-type monomers can also be used in this invention.

Any suitable siloxane-containing vinylic monomers can be used in the invention. One preferred class of siloxane-containing vinylic monomers are those vinylic monomers containing a tris(trialkylsiloxy)silyl group. Another preferred class of siloxane-containing vinylic monomers are those vinylic monomers containing a bis(trialkylsilyloxy)alkylsilyl group. Another preferred class of siloxane-containing vinylic monomers are those vinylic monomers containing an oligodimethylsiloxane or polysiloxane segment.

Any suitable silicone-containing vinylic monomers can be used in the invention. Examples of preferred silicone-containing vinylic monomers include without limitation N-[tris (trimethylsiloxy)silylpropyl]-(meth)acrylamide, N-[tris (dimethylpropylsiloxy)-silylpropyl]-(meth)acrylamide, N-[tris(dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy) methylsilyl)propyloxy)propyl]-2-methyl acrylamide; N,N-bis[2-hydroxy-3-(3-(bis(trimethylsilyloxy)methylsilyl) propyloxy)propyl]acrylamide; N-(2-hydroxy-3-(3-(tris (trimethylsilyloxy)silyl)propyloxy)propyl)-2-methyl acrylamide; N-(2-hydroxy-3-(3-(tris(trimethylsilyloxy)silyl) propyloxy)propyl)acrylamide; N,N-bis[2-hydroxy-3-(3-(tris (trimethylsilyloxy)silyl)propyloxy)propyl]-2-methyl acrylamide; N,N-bis[2-hydroxy-3-(3-(tris(trimethylsilyloxy)silyl) propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl] acrylamide; N,N-bis[2-hydroxy-3-(3-(t-butyldimethylsilyl) propyloxy)propyl]-2-methyl acrylamide; N,N-bis[2-hydroxy-3-(3-(t-butyldimethylsilyl)propyloxy)propyl] acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy) methylsilane, N-2-methacryloxyethyl-O-(methyl-bis-trimethylsiloxy-3-propyl)silyl carbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy) propyl terminated, mono-butyl terminated polydimethylsiloxane), monomethacrylamido-terminated or monoacrylamido-terminated polydimethylsiloxanes of various molecular weight (e.g., mono-3-methacrylamidopropyl terminated, mono-butyl terminated polydimethylsiloxane or mono-(3-methacrylamidopropyl terminated, mono-butyl terminated polydimethylsiloxane); mono-vinyl carbonate-terminated polydimethylsiloxanes of various molecular weight; mono-vinyl carbamate-terminated polydimethylsiloxanes of various molecular weight; siloxane-containing vinylic monomers each having an alkylbis(alkyldimethylsilyloxy)-silylalkyl group or a linear oligo-dimethylsiloxane chain having 3 to 10 dimethylsiloxane units as disclosed in U.S. provisional patent application No. 61/884,176 (incorporated by reference in its entirety), siloxane-containing vinylic monomers disclosed in US2014/0171542A1, US2014/0171539A1 and WO2014093772 (herein incorporated by references in their entireties).

Preferred examples of such siloxane-containing (meth) acrylamide-type monomers include without limitation N-[tris(trimethylsiloxy)silylpropyl](meth)acrylamide, N-[tris(dimethylethylsiloxy)-silylpropyl](meth)acrylamide, N-[tris(dimethylpropylsiloxy)silylpropyl](meth)acrylamide, N-[tris(dimethylphenylsiloxy)silylpropyl](meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl)acrylamide, N,N-bis[2-hydroxy-3-(3-(tris(trimethylsilyloxy)silyl)propyloxy)propyl]-2-methyl acrylamide, N,N-bis[2-hydroxy-3-(3-(tris(trimethylsilyloxy)silyl)propyloxy)propyl]acrylamide, N-(2-hydroxy-3-(3-(bis(trimethylsilyloxy)methylsilyl)pro-pyloxy)propyl)-2-methyl acrylamide, N-(2-hydroxy-3-(3-(bis(trimethylsilyloxy)methylsilyl)propyloxy)propyl)acrylamide, N,N-bis[2-hydroxy-3-(3-(bis(trimethylsilyloxy) methylsilyl)propyloxy)propyl]-2-methyl acrylamide, N,N-bis[2-hydroxy-3-(3-(bis(trimethylsilyloxy)methylsilyl) propyloxy)propyl]acrylamide, N-[2-hydroxy-3-(3-(t-butyldimethylsilyl)propyloxy)propyl]-2-methyl acrylamide, a siloxane-containing (meth)acrylamide-type monomer of formula (I), a siloxane-containing (meth)acrylamide-type monomer of formula (II),

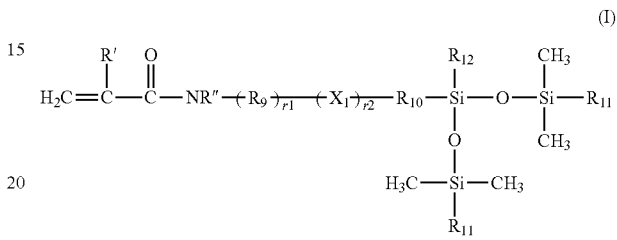

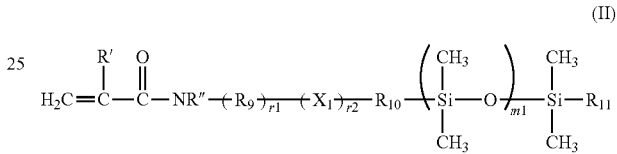

in which R' is hydrogen or methyl, R", $R_{11}$ and $R_{12}$ independent of one another are $C_1$-$C_6$ alkyl (preferably methyl), r1 and r2 independent of each other are integer of 0 or 1, m1 is an integer of 3 to 10 (preferably 3 to 8, more preferably 3 to 5), $R_9$ and $R_{10}$ independent of each other are a substituted or unsubstituted $C_1$-$C_{10}$ alkylene divalent group, $X_1$ is a linkage of

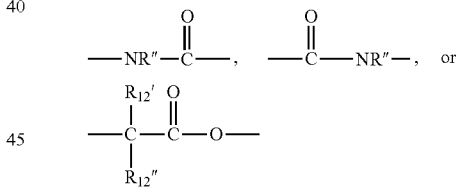

in which R" is as defined above and $R_{12}$" and $R_{12}$' independent of each other are $C_1$-$C_6$ alkyl (preferably methyl).

Preferred examples of a siloxane-containing (meth)acrylamide-type monomer of formula (I) include without limitation

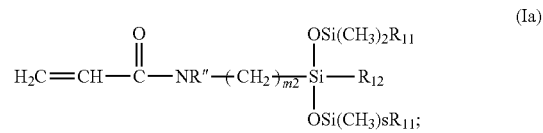

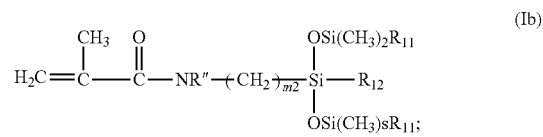

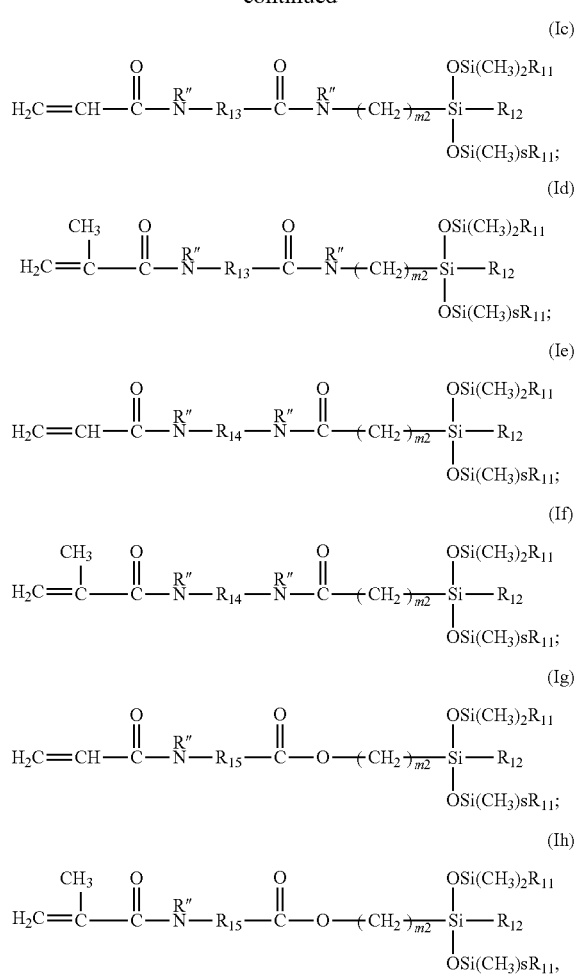

in which $R_{13}$ is an alkylene divalent group of —CH$_2$CH$_2$—, —CH$_2$CH$_2$CH$_2$—, —CH$_2$CH$_2$CH$_2$CH$_2$—,

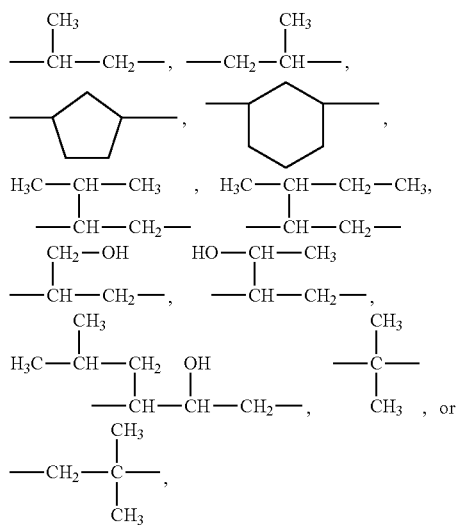

$R_{14}$ is a divalent alkylene radical of —CH$_2$CH$_2$— or —CH$_2$CH$_2$CH$_2$—, and $R_{15}$ is a divalent alkylene radical of

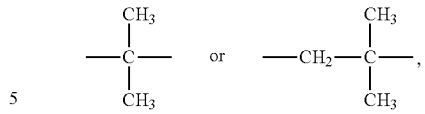

R″, $R_{12}$ and $R_{11}$ independent of one another are $C_1$-$C_4$ alkyl (preferably methyl), and m2 is an integer of from 3 to 5.

A siloxane vinylic monomer of formula (I) can be prepared from a monofunctional trisiloxane of formula (IV)

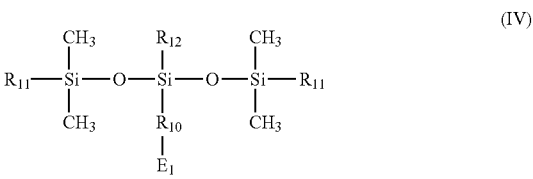

In which $R_{12}$, $R_{10}$ and $R_{11}$ are as defined above and $E_1$ is amino (—NH$_2$), carboxyl (—COOH) or hydroxyl group (—OH), by reacting it with N-hydroxysuccinimide ester of (meth)acrylic acid, (meth)acrylic acid halide (chloride or bromide), (meth)acrylic acid anhydride, (meth)acrylic acid, a NH$_2$-containing (meth)acrylamide, a carboxyl-containing (meth)acrylamide, or an azlactone-containing vinylic monomer (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one), in a coupling reaction, to obtain an N-substituted (meth)acrylamide. For obtaining N,N-substituted (meth)acrylamide, the resultant N-substituted (meth)acrylamide is further reacted with a $C_1$-$C_6$ alkyl halide according to a process described in U.S. Pat. No. 4,835,312 (herein incorporated by reference in its entirety).

Non-limiting examples of coupling reactions under various reaction conditions between a pair of matching co-reactive functional groups selected from the group preferably consisting of amino group (—NHR° in which R° is H or $C_1$-$C_{10}$ alkyl), hydroxyl group, carboxyl group, acid halide group (—COX, X=Cl, Br, or I), acid anhydrate group, aldehyde group, azlactone group, isocyanate group, epoxy group, aziridine group, and thiol group, are given below for illustrative purposes. An amino group reacts with aldehyde group to form a Schiff base which may further be reduced; an amino group —NHR° reacts with an acid chloride or bromide group or with an acid anhydride group to form an amide linkage (—CO—NR°—); an amino group —NHR° reacts with a N-hydroxysuccinimide ester group to form an amide linkage; an amino group —NHR° reacts with a carboxylic acid group in the presence of a coupling agent—carbodiimide (e.g., 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide to form an amide linkage; an amino group —NHR° reacts (ring-opening) with an azlactone group to form an alkylene-diamido linkage (—C(O)NH-alkylene-C(O)NR°— with R° as defined above); an amino group —NHR' reacts with an isocyanate group to form a urea linkage (—NR°—C(O)—NH— with R° as defined above); an amino group —NHR° reacts with an epoxy or aziridine group to form an amine bond (—C—NR°— with R° as defined above); a hydroxyl reacts with an isocyanate to form a urethane linkage; a hydroxyl reacts with an epoxy or aziridine to form an ether linkage (—O—); a hydroxyl reacts with an acid chloride or bromide group or with an acid anhydride group to form an ester linkage; an hydroxyl group reacts with an azlactone group in the presence of a catalyst to form an amidoalkylenecarboxy linkage (—C(O)NH-alkylene-C(O)—O—); a carboxyl group reacts with an epoxy group to form an ester bond; a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thioester linkage; a thiol group reacts with an azlactone group in the presence of a catalyst to form a linkage (—C(O)NH—CR$_{12}$R$_{12}$'—(CH$_2$)p-C(O)—S—); a thiol group reacts with a vinyl group based on thiol-ene reaction under thiol-ene reaction conditions to form a thioether linkage (—S—); a thiol group reacts with an acryloyl or methacryloyl group based on Michael Addition under appropriate reaction conditions to form a thioether linkage; an azetidinium group

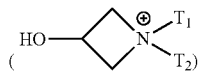

reacts with amino group (—NHR°), a carboxyl, a hydroxyl, or thiol to form a linkage (T$_1$T$_2$N—CH2-CH(OH)—CH$_2$-E- with E=NR°, COO, O, or S) at an temperature of from about 40° C. to 140° C.

The reactions conditions for the above described coupling reactions are taught in textbooks and are well known to a person skilled in the art.

A monofunctional trisiloxane of formula (IV) can be prepared from a hydrosiloxane-containing trisiloxane of formula (V)

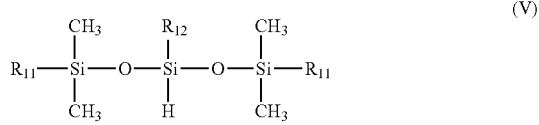

in which R$_{12}$ and R$_{11}$ are as defined above, by reacting it with an ene-containing monomer having an amino, carboxyl or hydroxyl group, in a platinum-catalyzed hydrosilylation reaction as known to a person skilled in the art.

Hydrosiloxane-containing trisiloxane of formula (IIb) can be prepared according to the procedures described in EP2136622B1 (herein incorporated by reference in its entirety).

Examples of an ene-containing monomer having an amino, carboxyl or hydroxyl group include without limitation vinyl-C$_1$-C$_{10}$ alkyl-carboxylic acid (i.e., CH$_2$=CH-(alk)$_t$-COOH in which t=1 to 10 and alk being a substituted or unsubstituted alkyl diradical, such as, for example, 3-butenoic acid, 4-pen-tenoic acid, 5-hexenoic acid, 6-heptenoic acid, 7-octenoic acid, 8-nonenoic acid, 9-decenoic acid); vinyl-C$_1$-C$_{12}$ alkylamines (allylamine, 3-butenylamine, 4-pentenylamine, 1-methyl-4-pentenylamine, 5-hexenylamine, 5-heptenylamine, 6-heptenylamine); N-allyl-C$_1$-C$_{12}$ alkylamines (e.g., N-ethyl-2-methylallylamine, N-ethylallylamine, N-allylmethylamine, N-allyl-1-pentanamine, N-allyl-2-methyl-1-pentanamine, N-Allyl-2,3-dimethyl-1-pentanamine, N-allyl-1-hexanamine, N-allyl-2-methyl-1-hexanamine, N-allyl-1-heptanamine, N-allyl-1-octanamine, N-allyl-1-ecanamine, N-allyl-1-dodecanamine); allyl-C$_1$-C$_{10}$ alkyl alcohols (e.g., allyl alcohol, allylcarbinol, allyethyl alcohol, 5-hexen-1-ol, 5-hexen-2-ol, 9-decen-1-ol); vinyl-C$_1$-C$_{10}$ alkyl halides (e.g., ally bromide, 4-bromo-1-butene, 5-bromo-1-pentene, 6-bromo-1-hexene, 7-bromo-1-heptene, 8-bromo-1-octene, 9-bromo-nonene, 10-bromo-1-decene); vinyl-C$_1$-C$_{10}$ alkyl epoxides (e.g., 3,4-epoxy-1-butene, 3,4-epoxy-1-pentene, 4,5-epoxy-1-pentene, 2-methyl-2-vinyloxirane, 1,2-epoxy-5-hexene, 1,2-epoxy-6-heptene, 1,2-epoxy-7-octene, 1,2-epoxy-8-nonene, 1,2-epoxy-9-decene); and azetidinium-containing ene-containing monomers (e.g., a reaction product of a N-allyl-C$_1$-C$_{12}$ alkylamine with epichlorohydrin).

A siloxane vinylic monomer of formula (Ia) or (Ib) can be prepared by first reacting a monofunctional trisiloxane of formula (IV) (in which E$_1$ is NH$_2$) with (meth)acrylic acid chloride (or bromide), (meth)acrylic acid anhydride, the N-hydroxysuccinimide ester of (meth)acrylic acid, or (meth)acrylic acid in the presence of EDC and N-hydroxysuccinimide to obtain an N-substituted (meth)acrylamide. N,N-substituted (meth)acrylamide can be obtained by reacting the resultant N-substituted (meth)acrylamide with alkyl halide (as described above).

A siloxane vinylic monomer of formula (Ic) or (Id) can be prepared by first reacting a monofunctional trisiloxane of formula (IV) (in which E$_1$ is NH$_2$) with carboxyl-containing (meth)acrylamide (e.g., a reaction product of N-hydroxysuccinimide ester of (meth)acrylic acid with an amino acid selected from the group consisting of β-alanine, γ-aminobutyric acid, 5-aminovaleric acid, 3-aminobutanoic acid, 3-aminoisobutyric acid, 3-aminocyclohexane carboxylic acid, 3-aminocyclopentane carboxylic acid, β-leucine, β-isoleucine, β-serine, β-threonine, or statine) or an azlactone-containing vinylic monomer (e.g., 2-vinyl-4,4-dimethyl-1,3-oxazolin-5-one, 2-isopropenyl-4,4-dimethyl-1,3-oxazolin-5-one, 2-vinyl-4,4-dimethyl-1,3-oxazolin-6-one, or 2-isopropenyl-4,4-dimethyl-1,3-oxazolin-6-one) to obtain an N-substituted (meth)acrylamide. N,N-substituted (meth)acrylamide can be obtained by reacting the resultant N-substituted (meth)acrylamide with alkyl halide (as described above).

A siloxane vinylic monomer of formula (Ie) or (If) can be prepared by first reacting a monofunctional trisiloxane of formula (IV) (in which E$_1$ is carboxyl group) with NH$_2$-containing (meth)acrylamide (e.g., (meth)acrylamidoethylamine or (meth)acrylamidopropylamine) to obtain an N-substituted (meth)acrylamide. N,N-substituted (meth)acrylamide can be obtained by reacting the resultant N-substituted (meth)acrylamide with alkyl halide (as described above).

A siloxane vinylic monomer of formula (Ig) or (Ih) can be prepared by reacting a monofunctional trisiloxane of formula (IV) (in which E$_1$ is hydroxyl group) with an azlactone-containing vinylic monomer (e.g., 2-vinyl-4,4-dimethyl-1,3-oxazolin-5-one, 2-isopropenyl-4,4-dimethyl-1,3-oxazolin-5-one, 2-vinyl-4,4-dimethyl-1,3-oxazolin-6-one, or 2-isopropenyl-4,4-dimethyl-1,3-oxazolin-6-one) to obtain an N-substituted (meth)acrylamide. N,N-substituted (meth)

acrylamide can be obtained by reacting the resultant N-substituted (meth)acrylamide with alkyl halide (as described above).

A siloxane vinylic monomer of formula (II) can be prepared from a monofunctional oligo-dimethylsiloxane of formula (VI)

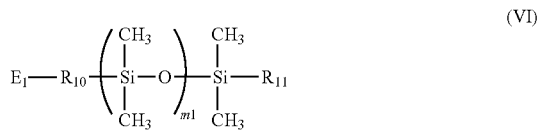

In which $R_{11}$, $R_{10}$, and m1 are as defined above and $E_1$ is amino (—NH$_2$), carboxyl (—COOH) or hydroxyl group (—OH), by first reacting it with N-hydroxysuccinimide ester of (meth)acrylic acid, (meth)acrylic acid halide (chloride or bromide), (meth)acrylic acid anhydride, (meth)acrylic acid, a NH$_2$-containing (meth)acrylamide, a carboxyl-containing (meth)acrylamide, or an azlactone-containing vinylic monomer (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one), in a coupling reaction well known to a person skilled in the art (as described above), to obtain mono-N-substituted (meth)acrylamido-terminated oligo-dimethylsiloxane vinylic monomer. Mono-N,N-substituted (meth)acrylamide-terminated oligo-dimethylsiloxane vinylic monomer can be obtained by reacting the resultant mono-N-substituted (meth) acrylamido-terminated oligo-dimethylsiloxane vinylic monomer with alkyl halide (as described above).

A monofunctional oligo-dimethylsiloxane of formula (VI) can be prepared by initiating the "living" polymerization of hexamethylcyclotrisiloxane with alkyl lithium (e.g., n-butyl lithium) and quenching the reaction with dimethylchlorosilane followed by hydrosilylation with an ene-containing monomer (e.g., allylamine, 3-butenylamine, 4-pentenylamine, 5-hexenylamine, 5-heptenylamine, 6-heptenylamine, allyl alcohol, allylcarbinol, allyethyl alcohol, 5-hexen-1-ol, 5-hexen-2-ol, 9-decen-1-ol, 3-butenoic acid, 4-pentenoic acid, 5-hexenoic acid, 6-heptenoic acid, 7-octenoic acid, 8-nonenoic acid, 9-decenoic acid).

Any polysiloxane crosslinkers can be used in this invention. Examples of polysiloxane crosslinkers include without limitation α,ω-dimethacryloxy-terminated or α,ω-diacryloxy-terminated polydimethylsiloxanes of various molecular weight; α,ω-vinyl carbonate-terminated polydimethylsiloxanes of various molecular weight; α,ω-vinyl carbamate-terminated polydimethylsiloxane of various molecular weight; α,ω-methacrylamido-terminated polydimethylsiloxanes of various molecular weight; α,ω-acrylamido-terminated polydimethylsiloxanes of various molecular weight; bis-3-methacryloxy-2-hydroxypropyloxypropyl polydimethylsiloxane of various molecular weight; N,N,N',N'-tetrakis(3-methacryloxy-2-hydroxypropyl)-alpha,omega-bis-3-aminopropyl-polydimethylsiloxane of various molecular weight; the reaction products of glycidyl methacrylate with amino-functional polydimethylsiloxanes; the reaction products of an azlactone-containing vinylic monomer (any one of those described above) with hydroxyl-functional polydimethylsiloxanes; polysiloxane crosslinkers described in U.S. Pat. No. 5,760,100, U.S. Pat. No. 8,163,206 and U.S. Pat. No. 8,480,227 (herein incorporated by references in their entireties); polysiloxane crosslinkers described in US patent application publication Nos 2012/0088843 A1, 2012/0088844 A1, and 2012/0088861 A1 (herein incorporated by references in their entireties), silicon-containing prepolymers comprising hydrophilic segments and polysiloxane segments described in commonly-owned U.S. Pat. Nos. 6,039,913, 7,091,283, 7,268,189, 7,238,750, 7,521,519, 8,557,940; commonly-owned US patent application publication Nos. US 2008-0015315 A1, US 2008-0143958 A1, US 2008-0143003 A1, US 2008-0234457 A1, US 2008-0231798 A1, US 2012-0088843 A1, US 2012-0088844 A1, and US 2012-0088861 A1 (all of which are incorporated herein by references in their entireties).

In a preferred embodiment, the monomer of lens-forming materials comprises a polysiloxane crosslinker of formula (III)

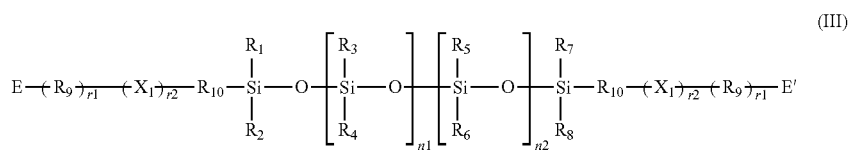

in which E and E' independent of each other are methacryloxy, (meth)acrylamide, or N—$C_1$-$C_6$ alkyl(meth)acrylamido group, $R_9$, $R_{10}$, $X_1$, r1, r2 are as defined above, n1 and n2 independently of each other are an integer of from 0 to 200 and (n1+n2) is from 10 to 200, and $R_1$, $R_2$, $R_3$, $R_4$, $R_5$, $R_6$, $R_7$, and $R_8$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-(OC$_2$H$_4$)$_{n3}$—OR° (in which alk is $C_1$-$C_6$-alkylene divalent radical, R° is H or $C_1$-$C_6$ alkyl and n3 is an integer from 1 to 10), or a linear hydrophilic polymer chain. More preferably, $R_1$ to $R_8$ are methyl; or $R_1$ to $R_4$ and $R_6$ to $R_8$ are methyl whereas $R_5$ is -alk-(OC$_2$H$_4$)$_{n3}$—OR° in which alk is $C_1$-$C_6$-alkylene divalent radical, R° is H or $C_1$-$C_{10}$ alkyl and n3 is an integer from 1 to 10.

Any suitable UV-absorbing vinylic monomers can be used in the preparation of a UV-absorbing polymer of the invention. A UV-absorbing vinylic monomer used in the invention comprises a benzophenone-moiety, preferably a benzotriazole-moiety. In a preferred embodiment, a UV-absorbing vinylic monomer used in the invention is a benzotriazole-containing UV/HEVL absorber that absorbs both ultraviolet light and high-energy violet light (HEVL) and preferably is represented by formula

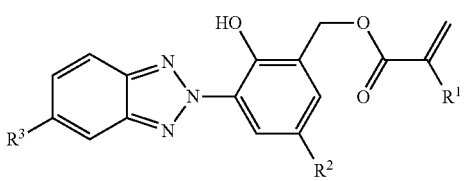

wherein $R^1$=H, $CH_3$, $CH_2CH_3$, or $CH_2OH$; $R^2$=$C_1$-$C_4$ alkyl or preferably $C_1$-$C_4$ alkoxy; and $R^3$=H, $CH_3$, $CH_3O$, F, Cl, Br, I, or $CF_3$. Preparation of those UV/HEVL absorbers of the above formula are described in U.S. Pat. No. 8,153,703 and U.S. Pat. No. 8,232,326, which are herein incorporated by references in their entireties. Benzotriazole-containing UV-absorbing vinyl monomers can be prepared according to procedures described in U.S. Pat. Nos. 3,299,173, 4,612,358, 4,716,234, 4,528,311 (herein incorporated by reference in their entireties) or can be obtained from commercial suppliers.

Examples of preferred benzophenone-containing UV-absorbing vinylic monomers include without limitation 2-hydroxy-4-acryloxy alkoxy benzophenone, 2-hydroxy-4-methacryloxy alkoxy benzophenone, allyl-2-hydroxybenzophenone, 4-acryloylethoxy-2-hydroxybenzophenone (UV2), 2-hydroxy-4-methacryloyloxybenzophenone (UV7), or combinations thereof. Benzophenone-containing UV-absorbing vinyl monomers can be prepared according to procedures described in U.S. Pat. No. 3,162,676 (herein incorporated by reference in its entirety) or can be obtained from commercial suppliers.

Examples of preferred UV-absorbing and UV/HEVL-absorbing, benzotriazole-containing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl)benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-(2'-hydroxy-5'-methacryloxyethylphenyl)benzotriazole(2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-5-methoxy-2H-benzotriazole (UV13), 2-[2'-Hydroxy-3'-tert-butyl-5'-(3'-acryloyloxypropoxy)phenyl]-5-trifluoromethyl-2H-benzotriazole ($CF_3$-UV13), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxyphenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS #83063-87-0).

Examples of more preferred UV-absorbing vinylic monomers include 2-hydroxy-5-methoxy-3-(5-(trifluoromethyl)-2H-benzo[d][1,2,3]triazol-2-yl)benzyl methacrylate (WL-1), 3-(5-fluoro-2H-benzo[d][1,2,3]triazol-2-yl)-2-hydroxy-5-methoxybenzyl methacrylate (WL-2), 2-[2'-Hydroxy-3'-tert-butyl-5'-(3'-acryloyloxypropoxy)phenyl]-5-trifluoromethyl-2H-benzotriazole ($CF_3$-UV13), 3-(5-chloro-2H-benzo[d][1,2,3]triazol-2-yl)-2-hydroxy-5-methoxybenzyl methacrylate (WL-4), 2-[3-(2H-benzotriazol-2-yl)-4-hydroxyphenyl]ethyl ester (Norbloc), and 2-{2'-Hydroxy-3'-tert-butyl-5'-[3'-methacryloyloxypropoxy]phenyl}-5-methoxy-2H-benzotriazole (UV13).

In a more preferred embodiment, the monomer of lens-forming materials comprises a UV/HEVL-absorbing vinylic monomer (e.g., 2-hydroxy-5-methoxy-3-(5-(trifluoromethyl)-2H-benzo[d][1,2,3]triazol-2-yl)benzyl methacrylate

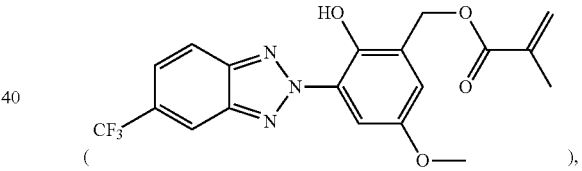

or 3-(5-chloro-2H-benzo[d][1,2,3]triazol-2-yl)-2-hydroxy-5-methoxybenzyl methacrylate

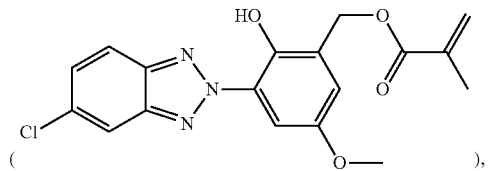 [SMILES: C=C(C)C(=O)OCc1cc(OC)cc(-n2nc3ccc(Cl)cc3n2)c1O]

or 2-[2'-Hydroxy-3'-tert-butyl-5'-(3'-acryloyloxypropoxy)phenyl]-5-trifluoromethyl-2H-benzotriazole

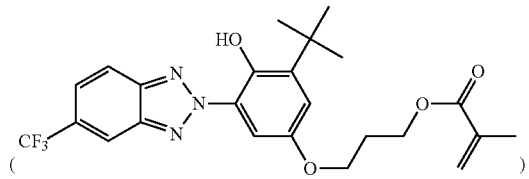 [SMILES: C=C(C)C(=O)OCCCOc1cc(-n2nc3ccc(C(F)(F)F)cc3n2)c(O)c(C(C)(C)C)c1]

capable of absorbing a light in a region between 400 nm and 440 nm, preferably present in an amount sufficient to impart resultant UV-absorbing silicone hydrogel contact lens a characteristics of having a transmittance of about 50% or less at 420 nm. Even more preferably, the monomer of lens-forming materials comprises a mixture of Norbloc 7966 (2-(2'-hydroxy-5'-methacryloxyethylphenyl)-2H-benzotriazole, i.e

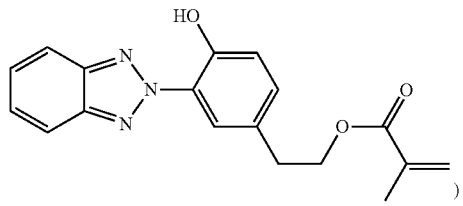 [SMILES: C=C(C)C(=O)OCCc1ccc(O)c(-n2nc3ccccc3n2)c1]

with 2-hydroxy-5-methoxy-3-(5-(trifluoromethyl)-2H-benzo[d][1,2,3]triazol-2-yl)benzyl methacrylate

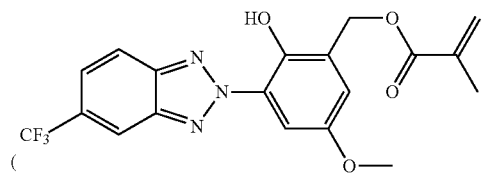

or 3-(5-chloro-2H-benzo[d][1,2,3]triazol-2-yl)-2-hydroxy-5-methoxybenzyl methacrylate

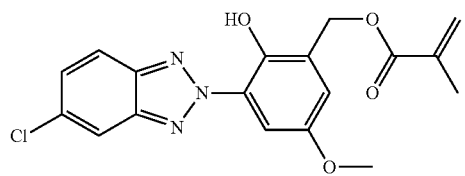

or 2-[2'-Hydroxy-3'-tert-butyl-5'-(3'-acryloyloxypropoxy)phenyl]-5-trifluoromethyl-2H-benzotriazole

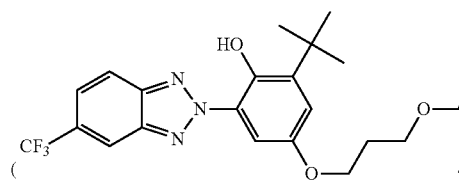

It is understood that the amount of at least one UV-absorbing vinylic monomer in the pre-polymerization mixture is sufficient to render a contact lens, which is obtained from the curing of the pre-polymerization mixture, ability of blocking or absorbing (i.e., the inverse of transmittance) at least 90% (preferably at least about 95%, more preferably at least about 97.5%, even more preferably at least about 99%) of UVB (between 280 and 315 nanometers), at least 70% (preferably at least about 80%, more preferably at least about 90%, even more preferably at least about 95%) of UVA transmittance (between 316 and 380 nanometers), and optionally (but preferably) at least 30% (preferably at least about 40%, more preferably at least about 50%, even more preferably at least about 60%) of violet light between 381 nm and 440 nm, which impinge on the lens.

Any germanium-based Norrish Type I photoinitiators can be used in this invention, so long as they are capable of initiating a free-radical polymerization under irradiation with a light source including a light in the region of about 380 to about 550 nm. Examples of germanium-based Norrish Type I photoinitiators are acylgermanium compounds described in U.S. Pat. No. 7,605,190 (herein incorporated by reference in its entirety). Preferably, the monomer of lens-forming materials comprises at least one of the following acylgermanium compounds.

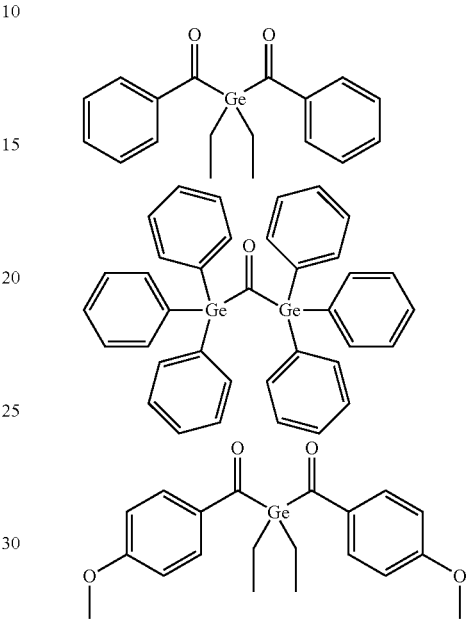

In accordance with the present invention, the pre-polymerization mixture can also comprise additional hydrophilic vinylic monomer other than hydrophilic(meth)acrylamide-type monomer. Nearly any hydrophilic vinylic monomer can be used in the invention. Suitable hydrophilic vinylic monomers are, without this being an exhaustive list, hydroxyl-substituted lower alkyl ($C_1$ to $C_6$) acrylates and methacrylates, hydroxyl-substituted lower alkyl vinyl ethers, N-vinylpyrrole, N-vinyl-2-pyrrolidone, 2-vinyloxazoline, 2-vinyl-4,4'-dialkyloxazolin-5-one, 2- and 4-vinylpyridine, olefinically unsaturated carboxylic acids having a total of 3 to 6 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol, N-vinyl alkylamide, N-vinyl-N-alkylamide, and the like. Among the preferred hydrophilic vinylic monomers are 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, and N-vinyl caprolactam. More preferably, the hydrophilic vinylic monomer other than amide-type vinylic monomer is N-vinyl-2-pyrrolidone (NVP), glycerol methacrylate (GMA), a $C_1$-$C_4$-alkoxy polyethylene glycol (meth)acrylate having a weight average molecular weight of from 200 to 1500, N-vinyl formamide, N-vinyl acetamide, N-vinyl isopropylamide, N-vinyl-N-methyl acetamide, or a mixture thereof.

A pre-polymerization mixture of lens-forming materials of the invention can also comprise a non-silicone hydrophobic monomer (i.e., free of silicone). By incorporating a certain amount of non-silicone hydrophobic vinylic monomer in a pre-polymerization mixture of lens-forming materials, the mechanical properties (e.g., modulus of elasticity) of the resultant polymer may be improved. Nearly any non-silicone hydrophobic vinylic monomer can be used in the actinically polymerizable composition for preparing the intermediary copolymer with pendant or terminal functional groups. Examples of preferred non-silicone hydrophobic vinylic monomers include methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

It is understood that if the hydrophilic vinylic monomer other than (meth)acrylamide-type monomer and/or non-silicone hydrophobic vinylic monomer are present in the pre-polymerization mixture, their total amount is less than about 10% by weight, preferably, less than about 8% by weight, even more preferably less than about 5% by weight.

In a preferred embodiment, the pre-polymerization mixture of lens-forming materials comprises a crosslinking agent, preferably selected from the group consisting of N,N'-methylene-bis-(meth)acrylamide, N,N'-ethylene-bis-(meth)acrylamide, N,N'-dihydroxyethylene-bis-(meth)acrylamide, 1,3-bis(acrylamidopropyl)-1,1,3,3-tetramethyldisiloxane, 1,3-bis(methacrylamidopropyl)-1,1,3,3-tetramethyldisiloxane, and combinations thereof.

Examples of visibility tinting agents (e.g., D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, or mixtures thereof).

A pre-polymerization mixture of lens-forming materials for making a UV-absorbing silicone hydrogel contact lens of the invention can further comprise antimicrobial agents (e.g., silver nanoparticles), a bioactive agent (e.g., a drug, an amino acid, a polypeptide, a protein, a nucleic acid, 2-pyrrolidone-5-carboxylic acid (PCA), an alpha hydroxyl acid, linoleic and gamma linoleic acids, vitamins, or any combination thereof), leachable lubricants (e.g., a non-crosslinkable hydrophilic polymer having an average molecular weight from 5,000 to 500,000, preferably from 10,000 to 300,000, more preferably from 20,000 to 100,000 Daltons), leachable tear-stabilizing agents (e.g., a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof), and the like, as known to a person skilled in the art.

In accordance with the invention, a pre-polymerization mixture of lens-forming materials is a fluid composition, which can be a solution or a melt at a temperature from about 20° C. to about 85° C. A pre-polymerization mixture of lens-forming materials can be prepared by dissolving all of the desirable components in any suitable solvent known to a person skilled in the art. Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. Preferably, a mixture of lens-forming materials is a solution of all the desirable components in water, 1,2-propylene glycol, a polyethyleneglycol having a molecular weight of about 400 Daltons or less, or a mixture thereof.

In a preferred embodiment, the pre-polymerization mixture of lens-forming materials of the invention comprises: (1) from about 10% to about 75% by weight, preferably from about 10% to about 65% by weight, even more preferably from about 15% to about 60% by weight, even more preferably from about 20% to about 55% by weight, of at least one hydrophilic vinylic monomer; (2) from about 5% to about 50% by weight, preferably from about 10% to about 40% by weight, more preferably from about 15% to about 30% by weight, of at least one siloxane-containing vinylic monomer; (3) from about 5% to about 50% by weight, preferably from about 10% to about 40% by weight, more preferably from about 15% to about 35% by weight, of at least one polysiloxane crosslinker; (4) from about 0.1% to about 4% by weight, preferably from about 0.2% to about 3% by weight, more preferably from about 0.5% to about 2.5% by weight, of at least one UV-absorbing vinylic monomer (preferably one capable of blocking violet radiation in the region of from 381 nm to 440 nm); and (5) from about 0.05% to about 1.5% by weight, preferably from about 0.1% to 1.3% by weight, more preferably from about 0.5% to about 1.1% by weight, of at least one germanium-based Norrish Type I photoinitiator. The foregoing range combinations are presented with the proviso that the listed components and any additional components add up to 100% by weight.

It is understood that a pre-polymerization mixture of lens-forming materials of the invention can be modified, e.g., by substituting the components (1) to (4) of the pre-polymerization mixture with one or more actinically-crosslinkable prepolymers which comprise monomeric units derived from at least one hydrophilic (meth)acrylamide-type monomer, at least one siloxane-containing (meth)acrylamide monomer, at least one polysiloxane crosslinker (preferably at least one α,ω-dimethacrylamido-terminated polysiloxane crosslinker, more preferably at least one α,ω-dimethacrylamido-terminated polysiloxane crosslinker of formula (V)), and at least one UV-absorbing vinylic monomer (preferably one capable of blocking violet radiation in the region of from 400 nm to 440 nm). Such actinically-crosslinkable prepolymers can be mixed with from about 0.05% to about 1.5% by weight (preferably from about 0.1% to 1.3% by weight, more preferably from about 0.5% to about 1.1% by weight) of at least one germanium-based Norrish Type I photoinitiator to form a pre-polymerization mixture for making UV absorbing silicone hydrogel contact lenses. Actinically-crosslinkable prepolymers containing UV-absorbing monomeric units can be prepared according to processes described in US 2012/0029111 A1, US 2012/0026457 A1, U.S. Pat. No. 8,480,227 and U.S. Pat. No. 8,431,624 (herein incorporated by references in their entireties).

In accordance with the invention, the pre-polymerization mixture can be introduced (dispensed) into a cavity formed by a mold according to any known methods.

After the pre-polymerization mixture is dispensed into the mold, it is polymerized to produce a contact lens. Crosslinking may be initiated upon exposure to a light source including a light in a region between 380 nm to 550 nm, preferably under a spatial limitation of actinic radiation, to crosslink the polymerizable components in the pre-polymerization mixture.

In accordance with the invention, light source can be any ones emitting light in the 380-550 nm range sufficient to activate germanium-based Norrish Type I photoinitiators. Blue-light sources are commercially available and include: the Palatray CU blue-light unit (available from Heraeus Kulzer, Inc., Irvine, Calif.), the Fusion F450 blue light system (available from TEAMCO, Richardson, Tex.), Dymax Blue Wave 200, LED light sources from Opsytec (385 nm, 395 nm, 405 nm, 435 nm, 445 nm, 460 nm), LED light sources from Hamamatsu (385 nm), and the GE 24" blue fluorescent lamp (available from General Electric Company, U.S.). A preferred blue-light source is the UV LED from Opsytec (those described above).

The intensity of the light source is set to produce lenses of good quality given the light source and photoinitiator. The total intensity of the light source is preferably from about 10 to about 100 mW/cm$^2$, preferably from about 20 to about 60 mW/cm$^2$ in the 380 nm to 550 nm region is more preferred.

The crosslinking according to the invention may be effected in any time period of about 40 minutes or less, preferably in a very short time (e.g. in about 120 seconds, preferably in about 80 seconds, more preferably in 50 about seconds, even more preferably in about 30 seconds, and most preferably in 5 to 30 seconds).

Opening of the mold so that the molded lens can be removed from the mold may take place in a manner known per se.

The molded contact lens can be subject to lens extraction to remove unpolymerized vinylic monomers and macromers. The extraction solvent can be any solvent known to a person skilled in the art. Examples of suitable extraction solvent are those described above for preparing pre-polymerization mixtures. After extraction, lenses can be hydrated in water or an aqueous solution of a wetting agent (e.g., a hydrophilic polymer).

The molded contact lenses can further subject to further processes, such as, for example, surface treatment (for example, such as, plasma treatment, chemical treatments, the grafting of hydrophilic monomers or macromers onto the surface of a lens, Layer-by-layer coating, in-package crosslinking of a thermally-reactive hydrophilic polymeric material, etc.); packaging in lens packages with a packaging solution which can contain about 0.005% to about 5% by weight of a wetting agent (e.g., a hydrophilic polymer), a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof), or an in-package-coating material; sterilization such as autoclave at from 118 to 124° C. for at least about 30 minutes; and the like.

Preferred surfaces treatments are LbL coating such as those described in U.S. Pat. Nos. 6,451,871, 6,719,929, 6,793,973, 6,811,805, 6,896,926 (herein incorporated by references in their entirety), plasma treatment, in-package-coating such as those disclosed in US Patent Application Publication Nos. 2011/0134387, 2012/0026457 and 2013/0118127 (herein incorporated by references in their entireties). A preferred plasma treatment is those processes in which an ionized gas is applied to the surface of an article as described in U.S. Pat. Nos. 4,312,575 and 4,632,844 (incorporated herein by reference in their entireties).

A contact lens of the invention preferably is characterized by having an average Violet-transmittance of about 65% or less (preferably about 60% or less, more preferably about 55% or less) between 380 and 440 nanometers.

A contact lens of the invention has an oxygen permeability of preferably at least about 40 barrers, more preferably at least about 60 barrers, even more preferably at least about 80 barrers (at about 35° C.).

A contact lens of the invention has an elastic modulus of about 2.0 MPa or less, preferably about 1.5 MPa or less, more preferably about 1.2 or less, even more preferably from about 0.4 MPa to about 1.0 MPa (at room temperature, about 22° C. to 28° C.).

A contact lens of the invention further has a water content of preferably from about 15% to about 70%, more preferably from about 20% to about 50% by weight (at room temperature, about 22° C. to 28° C.) when fully hydrated.

The water content of a silicone hydrogel contact lens can be measured according to Bulk Technique as disclosed in U.S. Pat. No. 5,849,811.

It should be understood that although in this aspect of the invention various embodiments including preferred embodiments of the invention may be separately described above, they can be combined and/or used together in any desirable fashion to arrive at different embodiments of a contact lenses of the invention.

All of the various embodiments of the molds, pre-polymerization mixture of lens-forming materials, and spatial limitation of radiation, and contact lens of the invention described above can be used in this aspect of the invention.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various aspects and various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

Example 1

Oxygen Permeability Measurements

The apparent oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where
J=oxygen flux [microliters $O_2$/cm$^2$–minute]
$P_{oxygen} = (P_{measured} - P_{water} vapor) = (\% O_2 \text{ in air stream})[mm Hg]$ = partial pressure of oxygen in the air stream
$P_{measured}$ = barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
$Dk_{app}$ is expressed in units of barrers.
The apparent oxygen transmissibility (Dk/t) of the material may be calculated by dividing the apparent oxygen permeability ($Dk_{app}$) by the average thickness (t) of the lens.

The above described measurements are not corrected for the so-called boundary layer effect which is attributable to the use of a water or saline bath on top of the contact lens during the oxygen flux measurement. The boundary layer effect causes the reported value for the apparent Dk of a silicone hydrogel material to be lower than the actual intrinsic Dk value. Further, the relative impact of the boundary layer effect is greater for thinner lenses than with thicker lenses. The net effect is that the reported Dk appear to change as a function of lens thickness when it should remain constant.

The intrinsic Dk value of a lens can be estimated based on a Dk value corrected for the surface resistance to oxygen flux caused by the boundary layer effect as follows.

Measure the apparent oxygen permeability values (single point) of the reference Iotrafilcon A (Focus® N&D® from CIBA VISION CORPORATION) or Iotrafilcon B (AirOptix™ from CIBA VISION CORPORATION) lenses using the same equipment. The reference lenses are of similar optical power as the test lenses and are measured concurrently with the test lenses.

Measure the oxygen flux through a thickness series of Iotrafilcon A or Iotrafilcon B (reference) lenses using the same equipment according to the procedure for apparent Dk measurements described above, to obtain the intrinsic Dk value ($Dk_i$) of the reference lens. A thickness series should cover a thickness range of approximately 100 μm or more. Preferably, the range of reference lens thicknesses will bracket the test lens thicknesses. The $Dk_{app}$ of these reference lenses must be measured on the same equipment as the test lenses and should ideally be measured contemporaneously with the test lenses. The equipment setup and measurement parameters should be held constant throughout the experiment. The individual samples may be measured multiple times if desired.

Determine the residual oxygen resistance value, $R_r$, from the reference lens results using equation 1 in the calculations.

$$R_r = \frac{\sum \left( \frac{t}{Dk_{app}} - \frac{t}{Dk_i} \right)}{n} \tag{1}$$

in which t is the thickness of the test lens (i.e., the reference lens too), and n is the number of the reference lenses measured. Plot the residual oxygen resistance value, $R_r$, vs. t data and fit a curve of the form Y=a+bX where, for the jth lens, $Y_j = (\Delta P/J)_j$ and $X=t_j$. The residual oxygen resistance, $R_r$ is equal to a.

Use the residual oxygen resistance value determined above to calculate the correct oxygen permeability $Dk_c$ (estimated intrinsic Dk) for the test lenses based on Equation 2.

$$Dk_c = t/[(t/Dk_a) - R_r] \tag{2}$$

The estimated intrinsic Dk of the test lens can be used to calculate what the apparent Dk ($Dk_{a\_std}$) would have been for a standard thickness lens in the same test environment based on Equation 3. The standard thickness ($t_{std}$) for Iotrafilcon A=85 μm. The standard thickness for Iotrafilcon B=60 μm.

$$Dk_{a\_std} = t_{std}/[(t_{std}/Dk_a) + R_{r\_std}] \tag{3}$$

Ion Permeability Measurements.

The ion permeability of a lens is measured according to procedures described in U.S. Pat. No. 5,760,100 (herein incorporated by reference in its entirety). The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm$^2$/minute.
Water Content (% by weight).

Lens water content is measured according to ISO 18369-4, section 4.6.2 (gravimetric or loss on drying).
Lens Diameter.

Lens diameter is measured according to ISO 18369-3, section 4.3 (projection comparator method).
Transmittance.

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH~7.0-7.4) as the reference. A UV/visible spectrophotometer, such as, Varian Cary 3E UV-Visible Spectrophotometer with a LabSphere DRA-CA-302 beam splitter or the like, can be used in this measurement. Percent transmission spectra are collected at a wavelength range of 250-800 nm with %T values collected at 0.5 nm intervals. This data is transposed onto an Excel spreadsheet and used to determine if the lenses conform to Class 1 UV absorbance. Transmittance is calculated using the following equations:

$$UVA\ \%\ T = \frac{\text{Average \% Transmission between 316 nm and 380 nm}}{\text{Luminescence \% } T}$$

$$UVB\ \%\ T = \frac{\text{Average \% Transmission between 280 nm and 315 nm}}{\text{Luminescence \% } T}$$

Violet % $T$ = Average % Transmission between 381 nm and 440 nm in which Luminescence % T is the weighted average % transmission between 380 and 780 according to ISO 18369.
Photo-rheology:

The photo-rheology experiment measures the elastic (G') and viscous modulus (G") as a function of time during curing. The experiment is conducted by using an appropriate light source, optionally cutoff filters to select wavelengths of interest, and a rheometer. The light source is a Mercury bulb in a Hamamatsu light source. The total intensity of light source is set by adjusting the shutter opening to get an appropriate intensity measured by a radiometer. The sample is placed between a quartz plate that allows UV light to pass through and the rheometer. The cure time is determined when the elastic modulus (G') reaches a plateau.
Color Measurement:

The lens color is measured using an X-Rite SP64 Spectrophotometer with X-Rite Color Master software. A Macor® dome that is approximately 97% reflective is used as the reflective surface and lens holder. Using a 4 mm aperture, the color is described using L*, a*, and b* values.
Determination of Internal Stress (or Good Cross-Sections):

The level of internal stress within a cast-molded contact lens (i.e., good cross-section) is analyzed by determining the curvature of a cross-section of a cast-molded contact lens. An autoclaved lens is cut through lens center using two LEICA 818 (High Profile Microtome) blades in parallel. The width of the cross section is about 300 microns. The lens cross-section is then placed in phosphate-buffered saline (PBS) on its edge. An image of the cross-section as it is free-floating in PBS is captured and compared to the approximate curvature of the mold (i.e., the designed curvature) for determining internal stress. The deviation in curvature of cross-section from the curvature of the forming mold (i.e., the designed curvature) is proportional to the internal stress within a lens. A good cross-section is shaped approximately like the mold. A bad cross-section (relatively high internal stress) can be flat, twisted, or inverted.

EII Calculation:

The intensity of the light is measured using Opsytec spectrometer ($I_0$). The UV/Vis spectrum of the formulation is measured in a 100 um quartz cell to mimic a lens thickness. The spectrum of the formulation is recorded as 1−T (T=transmittance). The effective intensity on initiator is calculated based on the following equation:

$$EII = \int_{lower}^{upper} (I_0(1-T))\,d\lambda$$

Intensity Gradient Calculation:

The intensity gradient calculation uses the same data used for the EII calculation except uses the following calculation.

$$\%\ int\ grad = \frac{\int_{lower}^{upper} (I_0(1-T))\,d\lambda}{\int_{lower}^{upper} (I_0)\,d\lambda}$$

Example 2

Preparation of CE-PDMS Macromer

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM (i.e., CE-PDMS terminated with methacrylate groups).
Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum ($2 \times 10^{-2}$ mBar). Then, under an atmosphere of dry nitrogen, 320 g of distilled MEK is then added into the reactor and the mixture is stirred thoroughly. 0.235 g of DBTDL is added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. About 0.235 g of DBTDL is added, and the reactor is held at about 55° C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18° C. to obtain CE-PDMS macromer with terminal methacrylate groups.

Example 3

Preparation of Lens Formulations for Photorheology Studies

A Pre-Polymerization Mixture of Lens Forming Materials

Lens formulations are prepared by mixing components listed in Table 1 followed by heating at 40° C. for 15 minutes. Formulation G required heating at 50° C. for 30 minutes.

TABLE 1

| | \multicolumn{7}{c}{Formulation} | | | | | | |
|---|---|---|---|---|---|---|---|
| | A | B | C | D | E | F | G |
| L-PEG 2000 | | | | | | | 0.15% |
| CE-PDMS | | | | | | | 31.85% |
| DMA | | | | | | | 23.24% |
| Tris-Am | | | | | | | 20.71% |
| WL-1 | — | — | — | — | — | — | 19.51% |
| 1-propanol | 23.07% | 23.07% | 23.82% | 23.57% | 23.32% | 23.07% | 1.2% |
| Darocur 1173 | 1% | — | — | — | — | — | 23.57% |
| TPO | — | 1% | — | — | — | — | — |
| Ge-PI | — | — | 0.25% | 0.5% | 0.75% | 1.0% | 0.5% |

L-PEG 2000: N-(carbonyl-methoxypolyethylene glycol-2000)-1,2-disteaoyl-sn-glycero-3-phosphoethanolamin, sodium salt;
CE-PDMS: chain-extended polydimethylsiloxane crosslinker prepared in Example 2;
DMA: N,N-dimethylacrylamide;
TRIS-Am: N-[tris(trimethylsiloxy)-silylpropyl]acrylamide;
WL-1: 2-hydroxy-5-methoxy-3-(5-(trifluoromethyl)-2H-benzo[d][1,2,3]triazol-2-yl)benzyl methacrylate;
Darocur 1173: 2-Hydroxy-2-methylpropiophenone;
TPO: Diphenyl(2,4,6-trimethylbenzoyl)phosphine oxide;
Ge-PI: Bis(4-methoxybenzoyl)diethylgermanium

Example 4

Photorheology Results

Photo-rheology experiments are carried out with lens formulation prepared in Example 3 according to the procedures described in Example 1. Results are reported in Table 2

TABLE 2

| | \multicolumn{7}{c}{Lens Formulation} | | | | | | |
|---|---|---|---|---|---|---|---|
| | A | B | C | D | E | F | G |
| Long-pass Cutoff filter (nm) | 330 | 380 | | | 420 | | |
| Intensity (mW/cm²) | 16 | 5 | | | 12.5 | | |
| Cure time (s) | 11 | 10 | 16 | 12 | 12 | 10 | 16 |
| G' (kPa) | 110 | 113 | 106 | 92 | 80 | 75 | 97 |

Example 5

Preparation of Formulations for Lens Fabrication

A Pre-Polymerization Mixture of Lens Forming Materials

Lens formulations are prepared by mixing components listed in Table 3 below followed by heating at 40° C. for 20 min. Formulations 5F and 5G require heating at 50° C. for 20 min.

TABLE 3

| | 5A | 5B | 5C | 5D | 5E | 5F | 5G | 5H |
|---|---|---|---|---|---|---|---|---|
| Carbazole violet | — | — | — | — | 30 ppm | — | 60 ppm | — |
| CuP tint (%) | 0.1 | — | 0.1 | 0.1 | 0.1 | 0.10 | 0.15 | 0.1 |
| DMPC (%) | | | | | 0.76 | | | |
| LPEG2000 (%) | | | | | 0.61 | | | |
| Norbloc (%) | — | 1 | 1 | 1 | 0.3 | 0.1 | 0.55 | 0.542 |
| WL-1 (%) | — | — | — | — | — | — | 0.25 | 0.246 |

TABLE 3-continued

| | 5A | 5B | 5C | 5D | 5E | 5F | 5G | 5H |
|---|---|---|---|---|---|---|---|---|
| WL-2 (%) | — | — | — | — | — | 1.0 | — | — |
| BZT (%) | — | — | — | — | 0.8 | — | — | — |
| CE PDMS (%) | 31.83 | 31.83 | 31.83 | 31.83 | 31.83 | 31.83 | 31.83 | 31.37 |
| Tris acrylamide (%) | 20.71 | 19.71 | 19.71 | 19.71 | 19.61 | 19.61 | 19.71 | 19.62 |
| Darocur 1173 (%) | 1.0 | — | — | — | — | — | — | — |
| TPO (%) | — | 0.75 | — | — | — | — | — | — |
| Ge-PI (%) | — | — | 0.36 | 0.6 | 0.6 | 0.6 | 0.6 | 0.6 |
| 1-propanol (%) | 21.75 | 22.10 | 23.82 | 23.07 | 23.57 | 23.32 | 23.07 | 23.20 |
| DMA (%) | 23.24 | 23.24 | 23.24 | 23.24 | 23.24 | 23.24 | 23.24 | 22.90 |

DMPC: 1,2-Dimyristoyl-sn-glycero-3-phophocholine
BZT: 2-(2'-hydroxy-3'-tert-butyl-5'[3"-(4-vinylbenzyloxy)propoxyphenyl]-5-methoxy-2H-benzotriazole
WL-2: 3-(5-fluoro-2H-benzo[d][1,2,3]triazol-2-yl)-2-hydroxy-5-methoxybenzyl methacrylate
Carbazole violet: pigment added to adjust final lens color
CuP tint: 5% copper phthalocyanine blue pigment dispersion in tris(trimethylsiloxy)silyl-propylmethacrylate, TRIS

Example 6

PAA-Coating Solution

A polyacrylic acid (PAA) coating solution is prepared by dissolving an amount of PAA (M.W.: 450 kDa, from Lubrizol) in a given volume of 1-propanol (1-PrOH) to have a concentration of about 0.44% by weight and the pH is adjusted with formic acid to about 2.0.

Preparation of In-Package-Coating Solution (IPC Saline).
Poly(AAm-co-AA) (90/10) partial sodium salt (~90% solid content, poly(AAm-co-AA) 90/10, Mw 200,000) is purchased from Polysciences, Inc. and used as received. Polyamidonamine epichlorohydrin (PAE) (Kymene, an azetidinium content of 0.46 assayed with NMR) is purchased from Ashland as an aqueous solution and used as received. IPC saline is prepared by dissolving about 0.07% w/w of poly (AAm-co-AA) (90/10) and about 0.15% of PAE (an initial azetidinium millimolar equivalents of about 8.8 millimole) in phosphate-buffered saline (PBS) (about 0.044 w/w % $NaH_2PO_4.H_2O$, about 0.388 w/w/% $Na_2HPO_4.2H_2O$, about 0.79 w/w % NaCl) and adjusting the pH to 7.2-7.4. Then the IPC saline is heat pre-treated for about 4 hours at about 70° C. (heat pretreatment). During this heat pretreatment, poly (AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC is cooled to room temperature then filtered using a 0.22 micron PES membrane filter.

Example 7

Lens Fabrication Using Formulation 5A

Figure 2:
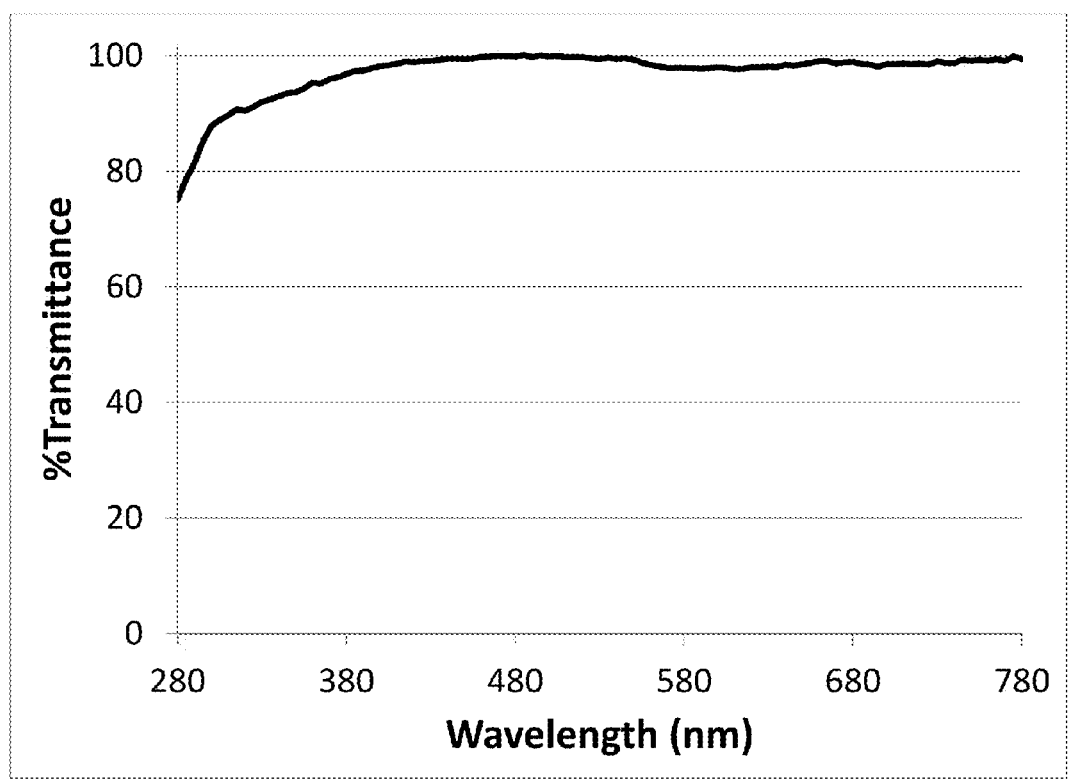
FIG. 2 shows the UV-Vis transmission spectrum of a silicone hydrogel contact lens produced from a mixture of lens-forming material (Formulation 5A, Example 5).

Lenses are prepared by cast-molding from the lens formulation prepared above in a reusable mold (quartz female mold half and glass male mold half), similar to the mold shown in FIGS. 1-6 in U.S. Pat. Nos. 7,384,590 and 7,387,759 (FIGS. 1-6). Lens formulation 5A prepared in Example 5 in the molds is irradiated for about 25 seconds using a Hamamatsu lamp with the light below 328 nm blocked by a long pass filter. The measured total intensity from 310 to 400 nm is 50 mW/cm². Cast-molded contact lenses are then extracted by dipping in the following series of baths: deionized (DI) water bath (about 56 seconds); 3 methyl ethyl ketone (MEK) baths (about 22, 78, 224 seconds respectively, (DI) water bath (about 56 seconds). After lens extraction, the lenses are in contact for 44 seconds with the PAA-coating solution prepared above to form a PAA coating on each lens, then equilibrated into water, and then placed into polypropylene shells containing 0.65 mL of IPC saline prepared above, and autoclaved for 45 minutes at 121° C. The UV/Vis spectrum is shown in FIG. 2.

Lens Fabrication Using Formulation 5B

Lenses are prepared by cast-molding from the lens formulation prepared above in a reusable mold (quartz female mold half and LBHH-1 male mold half). Lens formulation 5B prepared in Example 5 in the molds is irradiated for 25 seconds using a 405 nm LED supplied by Opsytec. The measured total intensity from 350 to 460 nm is about 30 mW/cm². Cast-molded contact lenses are then extracted by dipping in the following series of baths: deionized (DI) water bath (about 56 seconds); 3 methyl ethyl ketone (MEK) baths (about 22, 78, 224 seconds respectively, (DI) water bath (about 56 seconds). After lens extraction, the lenses are in contact for 44 seconds with the PAA-coating solution prepared above to form a PAA coating on each lens, then equilibrated into water, and then placed into polypropylene shells containing 0.65 mL of IPC saline prepared above, and autoclaved for 45 minutes at 121° C.

Lens Fabrication Using Formulation 5C

Figure 3:
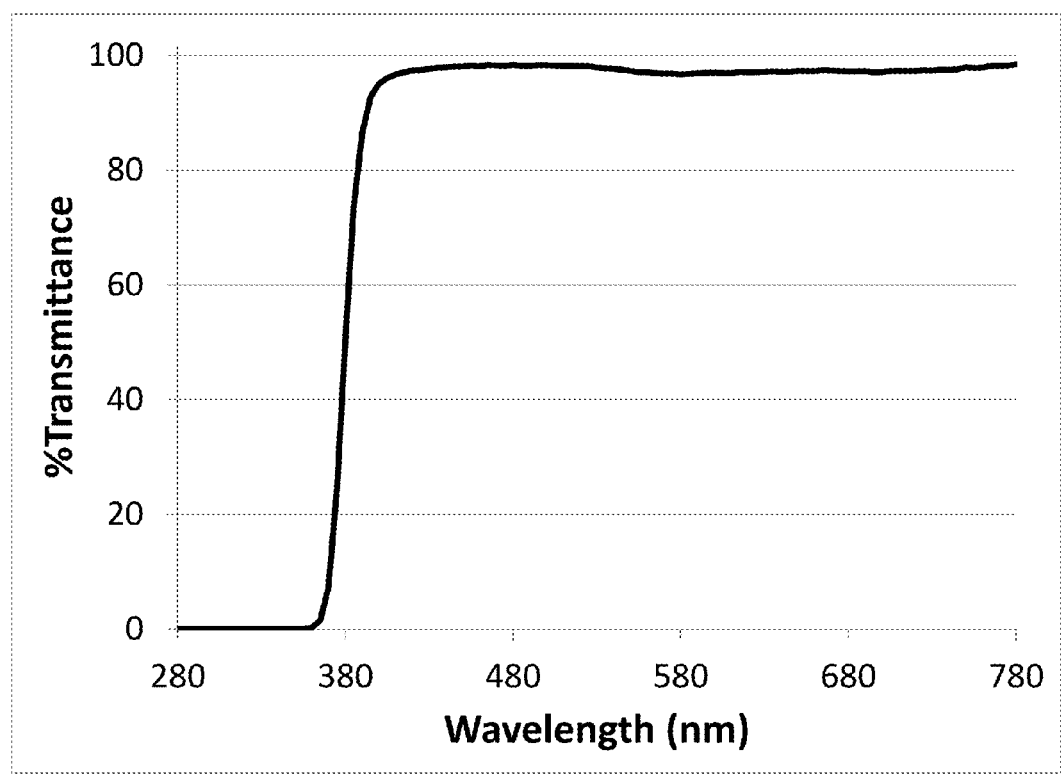
FIG. 3 shows the UV-Vis transmission spectrum of a silicone hydrogel contact lens made from a mixture of lens-forming material (Formulation 5C, Example 5).
Figure 4:
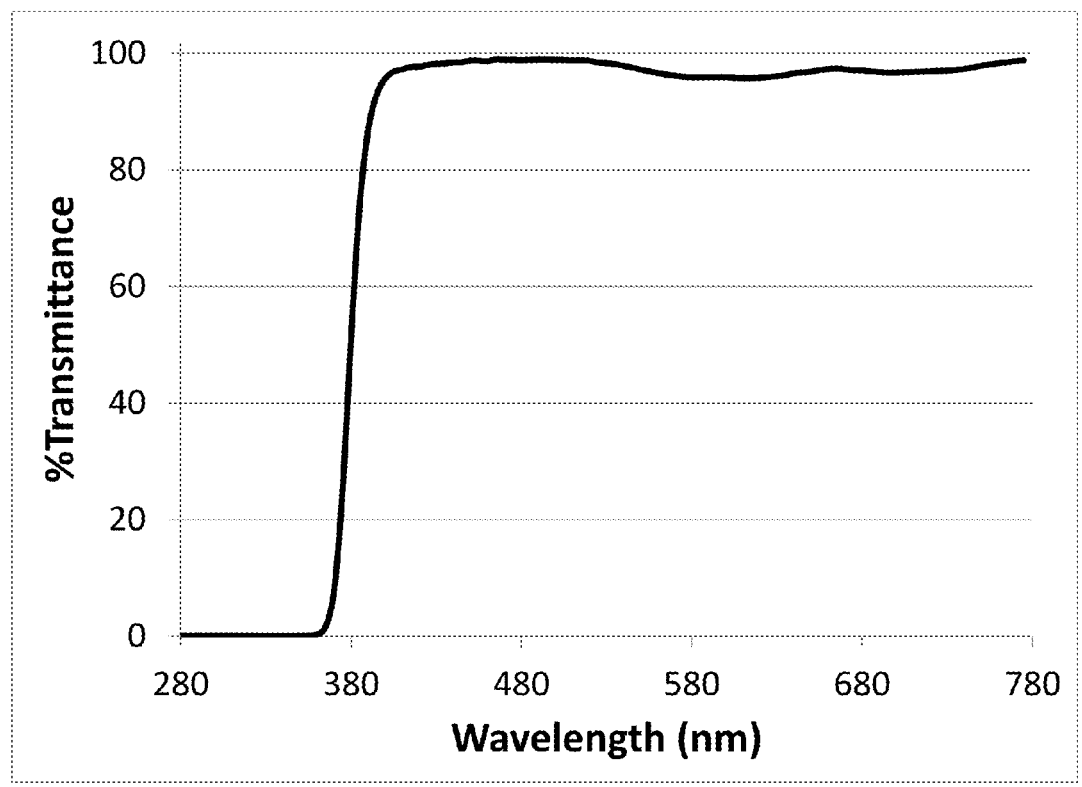
FIG. 4 shows the UV-Vis transmission spectrum of a silicone hydrogel contact lens produced from a mixture of lens-forming material (Formulation 5D, Example 5).
Figure 5:
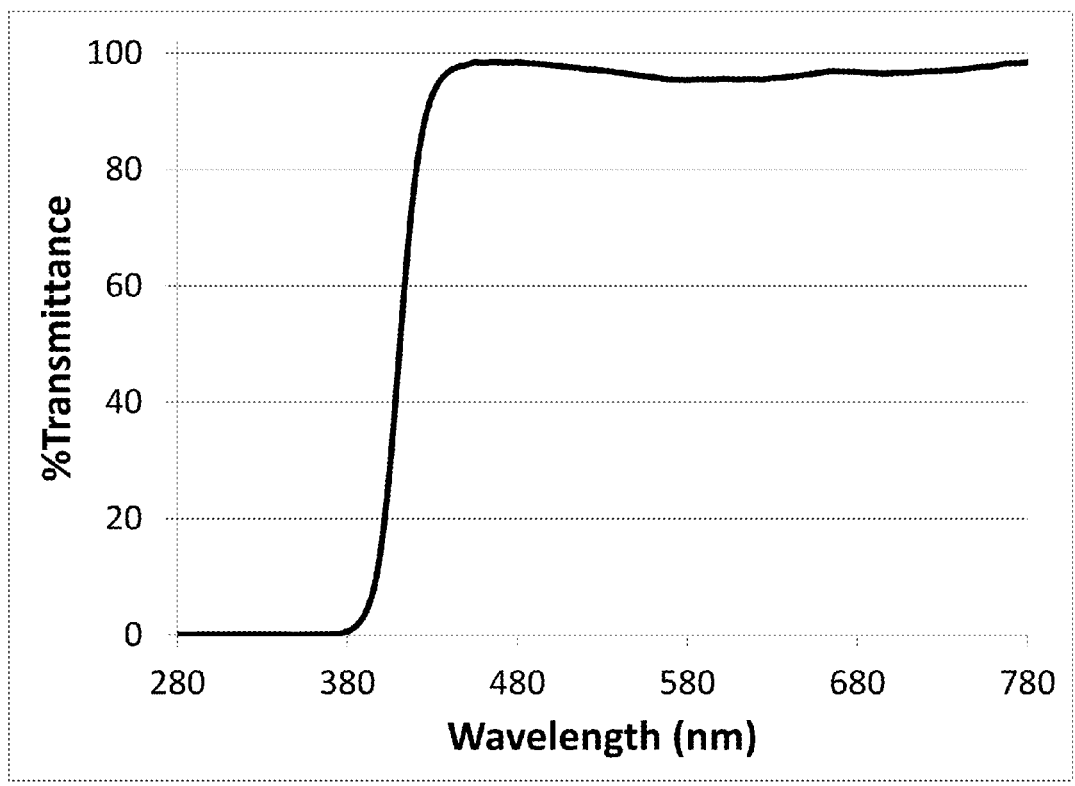
FIG. 5 shows the UV-Vis transmission spectrum of a silicone hydrogel contact lens made from a mixture of lens-forming material (Formulation 5E, Example 5).
Figure 6:
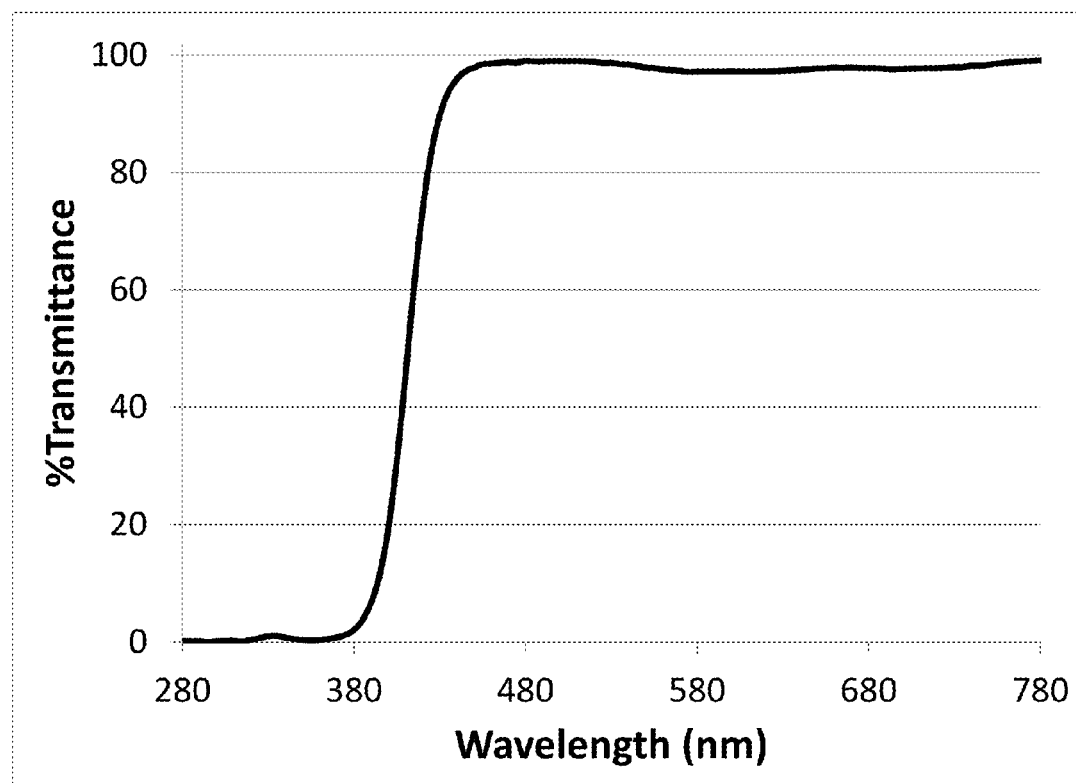
FIG. 6 shows the UV-Vis transmission spectrum of a silicone hydrogel contact lens produced from a mixture of lens-forming material (Formulation 5F, Example 5).
Figure 7:
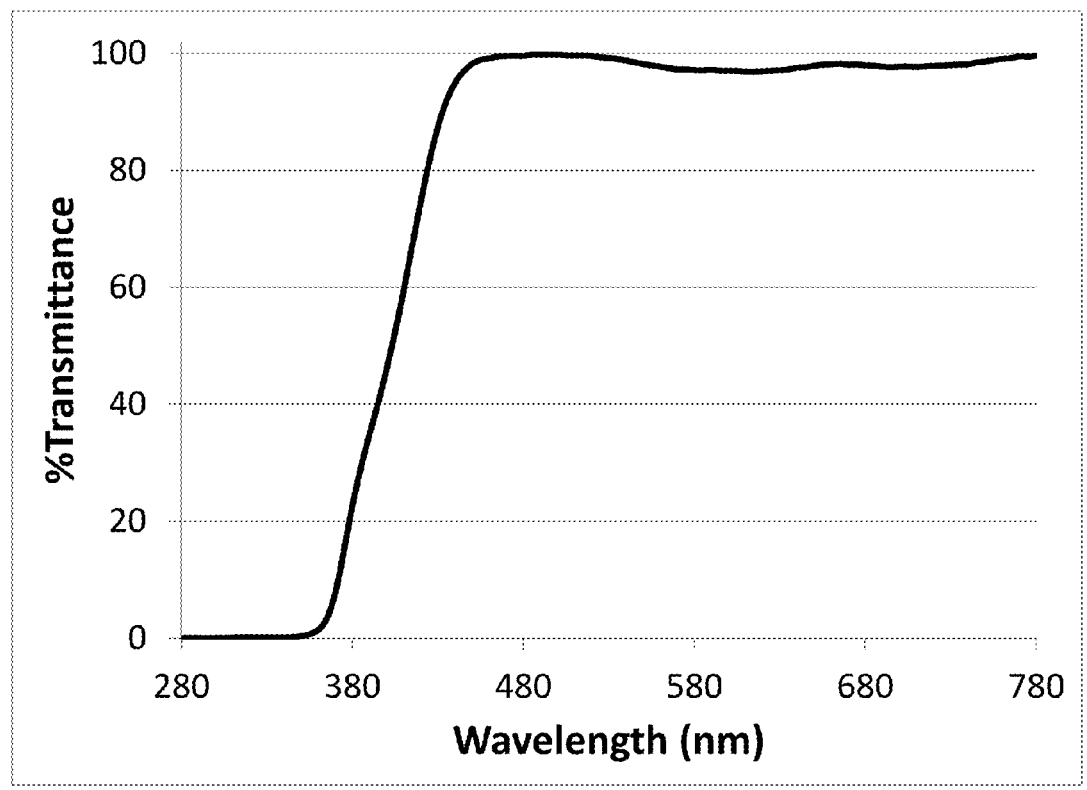
FIG. 7 shows the UV-Vis transmission spectrum of a silicone hydrogel contact lens made from a mixture of lens-forming material (Formulation 5G, Example 5).
Figure 8:
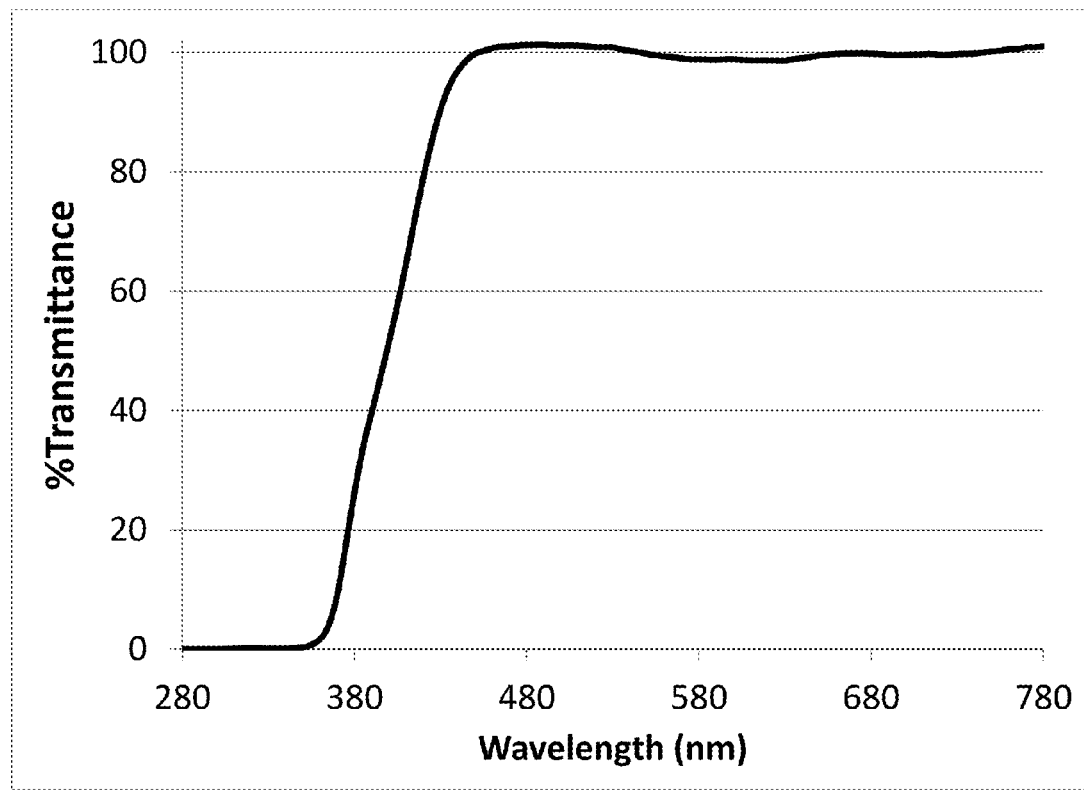
FIG. 8 shows the UV-Vis transmission spectrum of a silicone hydrogel contact lens produced from a mixture of lens-forming material (Formulation 5H, Example 5).
Figure 9:
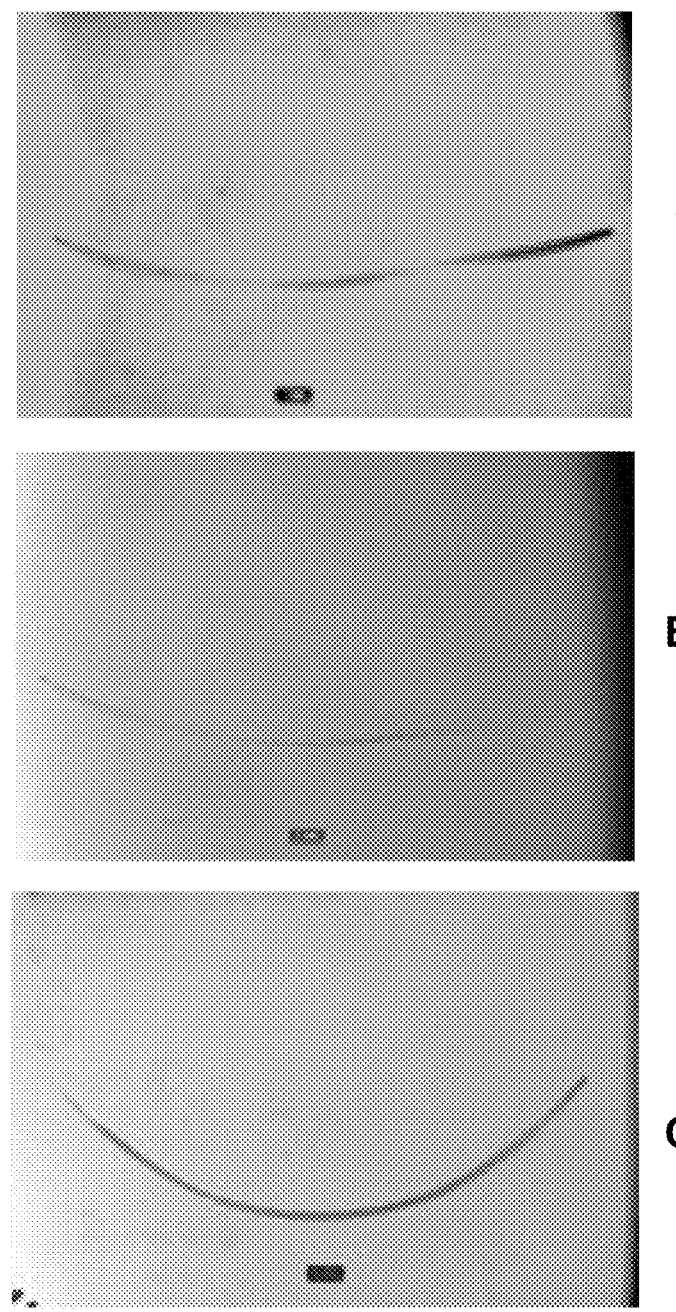
FIG. 9 shows the internal stress levels of three silicone hydrogel contact lenses cast-molded from three different pre-polymerization mixtures using different photoinitiators.

Lenses are prepared by cast-molding from the lens formulation prepared above in a reusable mold (quartz female mold half and LBHH-1 male mold half). Lens formulation 5C prepared in Example 5 in the molds is irradiated for 25 seconds using a 405 nm LED supplied by Opsytec. The measured total intensity from 350 to 460 nm is about 25 mW/cm². Cast-molded contact lenses are then extracted by dipping in the following series of baths: deionized (DI) water bath (about 56 seconds); 3 methyl ethyl ketone (MEK) baths (about 22, 78, 224 seconds respectively, (DI) water bath (about 56 seconds). After lens extraction, the lenses are in contact for 44 seconds with the PAA-coating solution prepared above to form a PAA coating on each lens, then equilibrated into water, and then placed into polypropylene shells containing 0.65 mL of IPC saline prepared above, and autoclaved for 45 minutes at 121° C. The UV/Vis spectrum is shown in FIG. 3.

Lens Fabrication using Formulation 5D-H

Lenses are prepared by cast-molding from the lens formulation prepared above in a reusable mold (quartz female mold half and ZnSe male mold half). Lens formulation 4C through G prepared in Example 4 in the molds are irradiated for 25 seconds using a 445 nm LED supplied by Opsytec. The measured total intensity from 200 to 800 nm is 54 mW/cm² (total intensity). Cast-molded contact lenses are then extracted by dipping in the following series of baths: deionized (DI) water bath (about 56 seconds); 3 methyl ethyl ketone (MEK) baths (about 22, 78, 224 seconds respectively, (DI) water bath (about 56 seconds). After lens extraction, the lenses are in contact for 44 seconds with the PAA-coating solution prepared above to form a PAA coating on each lens, then equilibrated into water, and then placed into polypropylene shells containing 0.65 mL of IPC saline prepared above, and autoclaved for 45 minutes at 121° C. The UV/Vis spectra are shown in FIGS. 4-8.

The lens properties and curing conditions are given in Table 4 below.

TABLE 4

|  | 5A | 5B | 5C | 5D | 5E | 5F | 5G | 5H |
|---|---|---|---|---|---|---|---|---|
| Cure Lamp | Hamamatsu | 405 nm LED | 405 nm LED | 445 nm LED | 445 nm LED | 445 nm LED | 445 nm LED | 445 nm LED |
| Total Intensity (mW/cm²) | 50 | 30 | 25 | 54 | 54 | 54 | 54 | 54 |
| Cure Time (s) | 25 | 25 | 25 | 25 | 25 | 25 | 25 | 25 |
| FC Mold | glass | L-BBH1 | L-BBH1 | ZnSe | ZnSe | ZnSe | ZnSe | ZnSe |
| Diameter (mm) | 14.13 | 14.05 | 14.23 | 14.12 | 14.28 | 14.49 | 14.31 | 14.13 |
| Water (%) | 31.48 | — | 32.11 | 31.4 | 32.05 | 35.64 | 32.6 | 32.77 |
| IP | 6.9 | 6.6 | 6.7 | 7.0 | 7.3 | 11.2 | 8.3 | 8.4 |
| Dkc | 131 | 127 | 124 | 127 | 122 | 116 | 125 | 123 |
| Modulus (mPa) | 0.72 | 0.63 | 0.67 | 0.64 | 0.63 | 0.64 | 0.63 | 0.62 |
| UVA % T | 93 | — | 4.9 | 4.7 | 0.08 | 0.70 | 2.5 | 3.7 |

TABLE 4-continued

|  | 5A | 5B | 5C | 5D | 5E | 5F | 5G | 5H |
|---|---|---|---|---|---|---|---|---|
| UVB % T | 85 | — | 0.056 | 0.057 | 0.028 | 0.14 | 0.048 | 0.22 |
| Violet % T | 98 | — | 90 | 91 | 47 | 47 | 59 | 64 |
| L* | 81.9 | — | — | — | 81.0 | 83.0 | 80.8 | 83.3 |
| a* | −2.2 | — | — | — | −4.3 | −4.7 | −4.3 | −6.9 |
| b* | −3.7 | — | — | — | 1.7 | 2.7 | 4.1 | 6.4 |

Example 8

Preparation of Formulations for Lens Fabrication

A Pre-Polymerization Mixture of Lens Forming Materials

The lens formulation is prepared by mixing components listed in Table 5 below followed by heating at 40° C. for 20 min.

TABLE 5

|  | 8A | 8B | 8C |
|---|---|---|---|
| CuP tint (%) | — | 0.1 | — |
| DMPC (%) | — | 0.76 | 0.76 |
| LPEG2000 (%) | — | 0.61 | 0.61 |
| Norbloc (%) | 1 | 1 | 1 |
| Betacon (%) | 25.92 | — | — |
| CE PDMS | — | 31.83 | 31.83 |
| TRIS (%) | 18.25 | — | — |
| Tris acrylamide (%) | — | 19.71 | 19.71 |
| TPO | — | — | 0.6 |
| Ge-PI (%) | 0.5 | 0.6 | — |
| Ethanol (%) | 25.45 | — | — |
| 1-Propanol | — | 22.15 | 22.25 |
| DMA (%) | 28.88 | 23.25 | 23.24 |

TRIS = tris(trimethylsiloxy)silylpropylmethacrylate
Betacon = α,ω-methacryloyl functionalized PDMS-perfluoroether macromer (see example B from patent 5,760,100)

Example 9

Lens Fabrication Using Formulation 8A

Lenses are prepared by cast-molding from the lens formulation prepared above in a polypropylene molds. Lens formulation 8A prepared in Example 8 in the molds are irradiated for 240 seconds using a 445 nm LED from Opsytec. The measured total intensity from 390 to 500 nm is 6.6 mW/cm². Cast-molded contact lenses are then hot water deblocked, extracted in isopropyl alcohol for a minimum of 4 hours, equilibrated into DI water, vacuum dried for a minimum of 2 hours at <500 Torr, then plasma coated. The plasma coating is done at a 2:1 ratio of methane gas and air. The lenses are equilibrated into PBS and autoclaved for 30 minutes at 121° C.

Lens Fabrication Using Formulation 8B

Lenses are prepared by cast-molding from the lens formulation prepared above in a polypropylene molds. Lens formulation 8B prepared in Example 8 in the molds are irradiated for 35 minutes (2100 seconds) using an InstantFit LEDtube model: 9290002842. The measured total intensity from 400 to 470 nm is 0.53 mW/cm². Cast-molded contact lenses are then extracted by dipping in the following series of baths: deionized (DI) water bath (about 56 seconds); 3 methyl ethyl ketone (MEK) baths (about 22, 78, 224 seconds respectively, (DI) water bath (about 56 seconds). After lens extraction, the lenses are in contact for 44 seconds with the PAA-coating solution prepared above to form a PAA coating on each lens, then equilibrated into water, and then placed into polypropylene shells containing 0.65 mL of IPC saline prepared above, and autoclaved for 45 minutes at 121° C. The lens properties and curing conditions are given in Table 6 below.

TABLE 6

|  | 8A | 8B |
|---|---|---|
| Cure Lamp | 445 nm LED | InstantFit LED |
| Total Intensity (mW/cm²) | 6.6 | 0.53 |
| Cure Time (s) | 240 | 2100 |
| Mold | Polypropylene | Polypropylene |
| Diameter (mm) | 14.08 | 14.68 |
| Water (%) | 32.1 | 30.4 |
| IP | 2.0 | 2.9 |
| Dkc | 104 | 130 |
| Modulus (mPa) | 0.94 | 0.82 |
| UVA % T | — | 4.6 |
| UVB % T | — | 0.061 |

Lens Fabrication Using Formulation 8C

Lenses are prepared by cast-molding from the lens formulation prepared above in a reusable mold (quartz female mold half and LBHH-1 male mold half). Lens formulation 8C prepared in Example 8 in the molds is irradiated for 25 seconds using a 405 nm LED supplied by Opsytec. The measured total intensity from 350 to 460 nm is about 30 mW/cm². Cast-molded contact lenses are then extracted by dipping in the following series of baths: deionized (DI) water bath (about 56 seconds); 3 methyl ethyl ketone (MEK) baths (about 22, 78, 224 seconds respectively, (DI) water bath (about 56 seconds). After lens extraction, the lenses are in contact for 44 seconds with the PAA-coating solution prepared above to form a PAA coating on each lens, then equilibrated into water, and then placed into polypropylene shells containing 0.65 mL of IPC saline prepared above, and autoclaved for 45 minutes at 121° C.

Example 10

Silicone hydrogel contact lenses prepared in Examples 7 and 9 from three different pre-polymerization mixtures (i.e., lens-forming formulations) using TPO and Ge as photoinitiators are examined for internal stress (quality of cross-section) according to the procedures described in Example 1. The cross-section of a silicone hydrogel contact lens prepared from Formulation 5C using Ge-PI as photoinitiator has a curvature substantially similar to that of its forming mold (i.e., the designed curvature), indicating no or minimal internal stress (i.e., good cross-sections) (FIG. 9C). However, the cross-sections of a silicone hydrogel contact lens prepared from either Formulation 8C or 5B using TPO as photoinitiator have a relatively-flat and slightly-twisted curvature—significantly-deviating from the designed curvature (FIGS. 9A and 9B), although both Formulation 8C and Formulation 5B have EII and Intensity Gradient either slightly smaller than or very similar to those of Formulation 5C (Table 7).

TABLE 7

| Formulation | 8C | 5B | 5C |
|---|---|---|---|
| Initiator | TPO | TPO | Ge-PI |
| Initiator concentration (%) | 0.6 | 0.72 | 0.36 |
| Intensity Gradient (%) | 11 | 13 | 15 |
| EII (mW/cm$^2$) | 3.0 | 3.6 | 3.7 |
| Cure Time (s) | 25 | 25 | 25 |

What is claimed is:

1. A method for producing UV-absorbing silicone hydrogel contact lenses which have an UVB transmittance of about 10% or less between 280 and 315 nanometers, an UVA transmittance of about 30% or less between 316 and 380 nanometers, and an average violet transmittance of about 70% or less between 381 nm and 440 nm, the method comprising the steps of:
   (1) providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
   (2) introducing a UV-absorbing pre-polymerization mixture of lens-forming materials into the cavity, wherein the pre-polymerization mixture comprises
      (a) at least one hydrophilic vinylic monomer,
      (b) at least one siloxane-containing vinylic monomer,
      (c) at least one polysiloxane crosslinker with two or more ethylenically-unsaturated groups,
      (d) a first UV-absorbing vinylic monomer and a second UV-absorbing vinylic monomer, wherein the first UV-absorbing vinylic monomer absorbs UV radiation and high-energy-violet-light radiation of from 380 nm to 440 nm, wherein the second UV-absorbing vinylic monomer absorbs UV radiation, wherein the first and second vinylic monomers are present in the UV-absorbing pre-polymerization mixture in an amount sufficient to render a contact lens formed from the curing of the UV-absorbing pre-polymerization mixture an ability of blocking at least 90% of UVB light between 280 and 315 nanometers, at least 70% of UVA light between 316 and 380 nanometers, and at least 30% of high-energy violet light between 381 nm and 440 nm,
      (e) at least one visibility-tinting agent, and
      (f) from about 0.05% to about 1.5% by weight of at least one germanium-based Norrish Type I photoinitiator capable of initiating a free-radical polymerization under irradiation with a light source including a light in the region of about 380 to about 550 nm; and
   (3) irradiating the pre-polymerization mixture in the mold with a light in a region of from 380 to 550 nm and crosslinking the lens-forming materials to form an UV-absorbing silicone hydrogel contact lens,
   wherein the formed UV-absorbing silicone hydrogel contact lens is substantially free of internal stress and has an UVB transmittance of about 10% or less between 280 and 315 nanometers, an UVA transmittance of about 30% or less between 316 and 380 nanometers, and an average violet transmittance of about 70% or less between 381 nm and 440 nm.

2. The method of claim 1, wherein said at least one visibility-tinting agent comprise a violet-tinting agent.

3. The method of claim 1, wherein the first UV-absorbing vinylic monomer is a benzotriazole-containing UV/HEVL vinylic monomer of formula

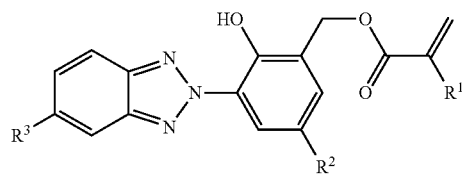

wherein $R^1$=H, $CH_3$, $CH_2CH_3$, or $CH_2OH$; $R^2$=$C_1$-$C_4$ alkyl or $C_1$-$C_4$ alkoxy; and $R^3$=H, $CH_3$, $CH_3O$, F, Cl, Br, I, or $CF_3$.

4. The method of claim 3, wherein in the formula of the benzotriazole-containing UV/HEVL vinylic monomer, $R^1$=$CH_3$; $R^2$=$CH_3O$; and $R^3$=H, $CH_3$, $CH_3O$, F, or $CF_3$.

5. The method of claim 1, wherein the second UV-absorbing vinylic monomer is 2-(2'-hydroxy-5'-methacryloxyethylphenyl)-2H-benzotriazole.

6. The method of claim 1, wherein said at least one germanium-based Norrish Type I photoinitiator comprises an acylgermanium compound of formula

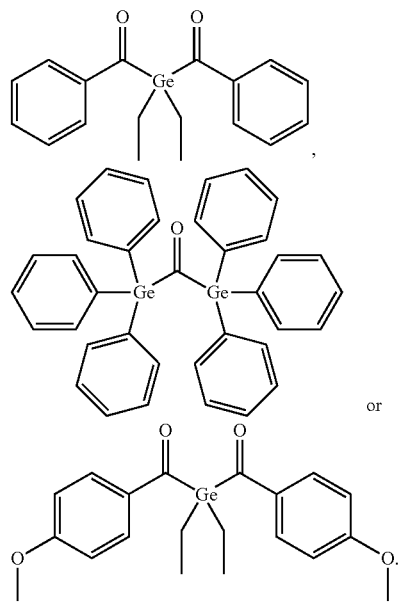

7. The method of claim 2, wherein said at least one visibility-tinting agent comprises a blue-tinting agent.

8. The method of claim 1, the pre-polymerization mixture of lens-forming materials of the invention comprises: (1) from about 10% to about 75% by weight of at least one hydrophilic vinylic monomer; (2) from about 5% to about 50% by weight of at least one siloxane-containing vinylic monomer; (3) from about 5% to about 50% by weight of at least one polysiloxane crosslinker; (4) from about 0.1% to about 4% by weight of the first and second UV-absorbing vinylic monomers; and (5) from about 0.05% to about 1.5% by weight of at least one germanium-based Norrish Type I photoinitiator, provided that the listed components and any additional components add up to 100% by weight.

9. The method of claim 1, wherein the hydrophilic vinylic monomer is a hydrophilic (meth)acrylamide-type monomer and the siloxane-containing vinylic monomer is a siloxane-containing (meth)acrylamide-type monomer, wherein the pre-polymerization mixture is characterized by having an ability to be cured within about 100 seconds by a visible light having a total intensity of from about 10 to about 100 mW/cm$^2$ in the wavelength region from 380 nm to 550 nm.

10. The method of claim 9, wherein the mold is a reusable mold suitable, wherein the step of irradiating is performed under a spatial limitation of actinic radiation, wherein the formed UV-absorbing silicone hydrogel contact lens comprises a lens edge defined by the spatial limitation of actinic radiation.

11. The method of claim 9, wherein the hydrophilic (meth) acrylamide-type monomer is N,N-dimethylacrylamide, N,N-dimethylmethacrylamide, N-(hydroxymethyl)acrylamide, N-hydroxyethyl acrylamide, N-hydroxypropyl acrylamide, N-[Tris(hydroxymethyl)methyl]acrylamide, acrylamide, methacrylamide, N-(2-aminoethyl)(meth)acrylamide, N-(3-aminopropyl)(meth)acrylamide, or a mixture thereof.

12. The method of claim 11, wherein the siloxane-containing (meth)acrylamide-type monomer is selected from the group consisting of N-[tris(trimethylsiloxy)silylpropyl] (meth)acrylamide, N-[tris(dimethylethylsiloxy)-silylpropyl] (meth)acrylamide, N-[tris(dimethylpropylsiloxy)silylpropyl]acrylamide, N-[tris(dimethylphenylsiloxy)silylpropyl] (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl)acrylamide, N,N-bis[2-hydroxy-3-(3-(tris(trimethylsilyloxy)silyl)propyloxy)propyl]-2-methyl acrylamide, and N,N-bis[2-hydroxy-3-(3-(tris(trimethylsilyloxy)silyl)propyloxy)propyl]acrylamide, N-(2-hydroxy-3-(3-(bis(trimethylsilyloxy)methylsilyl)propyloxy)propyl)-2-methyl acrylamide, N-(2-hydroxy-3-(3-(bis(trimethylsilyloxy)methylsilyl)propyloxy)propyl) acrylamide, N,N-bis[2-hydroxy-3-(3-(bis(trimethylsilyloxy)methylsilyl)propyloxy)propyl]-2-methyl acrylamide, N,N-bis[2-hydroxy-3-(3-(bis(trimethylsilyloxy)methylsilyl)propyloxy)propyl] acrylamide, N-[2-hydroxy-3-(3-(t-butyldimethylsilyl) propyloxy)propyl]-2-methyl acrylamide, a siloxane-containing (meth)acrylamide-type monomer of formula (I), a siloxane-containing (meth)acrylamide-type monomer of formula (II), and combinations thereof,

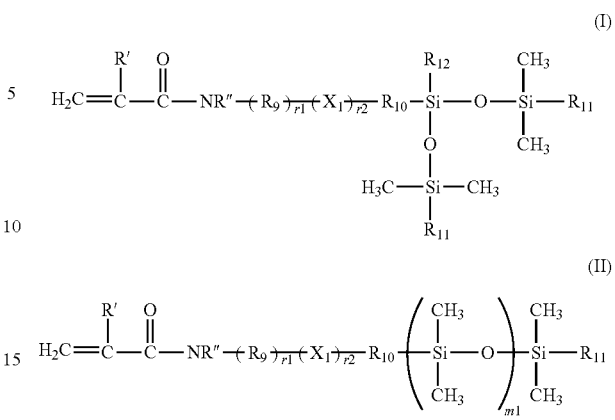

in which R' is hydrogen or methyl, R", $R_{11}$ and $R_{12}$ independent of one another are $C_1$-$C_6$ alkyl, r1 and r2 independent of each other are integer of 0 or 1, m1 is an integer of 3 to 10, $R_9$ and $R_{10}$ independent of each other are a substituted or unsubstituted $C_1$-$C_{10}$ alkylene divalent group, $X_1$ is a linkage of

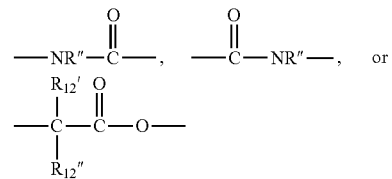

in which R" is as defined above and $R_{12}$" and $R_{12}$' independent of each other are $C_1$-$C_6$ alkyl.

13. The method of claim 12, wherein said at least one polysiloxane crosslinker comprises a polysiloxane crosslinker of formula (III)

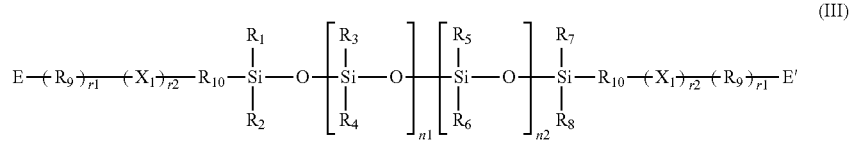

in which E and E' independent of each other are methacryloxy, (meth)acrylamide, or N—$C_1$-$C_6$ alkyl (meth)acrylamido group, $R_9$, $R_{10}$, $X_1$, r1, r2 are as defined above, n1 and n2 independently of each other are an integer of from 0 to 200 and (n1+n2) is from 10 to 200, and $R_1$, $R_2$, $R_3$, $R_4$, $R_5$, $R_6$, $R_7$, and $R_8$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-$(OC_2H_4)_{n3}$—OR° in which alk is $C_1$-$C_6$-alkylene divalent radical, R° is H or $C_1$-$C_6$ alkyl and n3 is an integer from 1 to 10, or a linear hydrophilic polymer chain.

14. The method of claim 1, wherein the light source is a light-emitting-device having a peak wavelength of from 410 nm to 480 nm.

15. The method of claim 9, wherein the intensity of the light source is from about 4 to about 80 mW/cm$^2$ in the 380 nm to 550 nm region, wherein the pre-polymerization mixture in the mold is irradiated under the spatial limitation of actinic radiation for a time period of about 50 seconds or less.

16. The method of claim 3, wherein the second UV-absorbing vinylic monomer is 2-(2'-hydroxy-5'-methacryloxyethylphenyl)-2H-benzotriazole.

17. A UV-absorbing silicone hydrogel contact lens obtained according to a method of claim 1, wherein the contact lens has: an oxygen permeability of at least about 40 barrers at about 35° C.; an elastic modulus of about 2.0 MPa or less at room temperature; and/or a water content of from about 15% to about 70% at room temperature when fully hydrated.

* * * * *